US008300725B2

(12) United States Patent
Kishigami et al.

(10) Patent No.: US 8,300,725 B2
(45) Date of Patent: Oct. 30, 2012

(54) RADIO TRANSMISSION DEVICE, RADIO RECEPTION DEVICE, RADIO TRANSMISSION METHOD, AND RADIO RECEPTION METHOD

(75) Inventors: Takaaki Kishigami, Osaka (JP); Hidenori Kayama, Miyagi (JP)

(73) Assignee: Panasonic Corporation, Osaka (JP)

( * ) Notice: Subject to any disclaimer, the term of this patent is extended or adjusted under 35 U.S.C. 154(b) by 906 days.

(21) Appl. No.: 12/377,362

(22) PCT Filed: Nov. 29, 2007

(86) PCT No.: PCT/JP2007/073101
§ 371 (c)(1),
(2), (4) Date: Feb. 12, 2009

(87) PCT Pub. No.: WO2008/069105
PCT Pub. Date: Jun. 12, 2008

(65) Prior Publication Data
US 2010/0220808 A1    Sep. 2, 2010

(30) Foreign Application Priority Data

Nov. 30, 2006  (JP) .................................. 2006-324522
Nov. 28, 2007  (JP) .................................. 2007-307757

(51) Int. Cl.
*H04L 27/00*  (2006.01)
(52) U.S. Cl. .......... 375/295; 375/219; 375/260; 375/297
(58) Field of Classification Search .................. 375/295, 375/297, 219, 260
See application file for complete search history.

(56) References Cited

U.S. PATENT DOCUMENTS

| 6,625,111 B1 | 9/2003 | Sudo |
| 7,848,439 B2 | 12/2010 | She |
| 2003/0053412 A1* | 3/2003 | Yoshida et al. ............... 370/208 |
| 2008/0107158 A1 | 5/2008 | Yoshii |
| 2010/0027496 A1* | 2/2010 | Higuchi et al. ............... 370/329 |
| 2010/0048237 A1* | 2/2010 | Kishiyama et al. .......... 455/522 |

FOREIGN PATENT DOCUMENTS

| CN | 1267154 | 9/2000 |
| JP | 11-98102 | 4/1999 |
| JP | 2000-151548 | 5/2000 |
| JP | 2003-87213 | 3/2003 |

(Continued)

OTHER PUBLICATIONS

International Search Report dated Mar. 11, 2008.
G.J. Foschini, "Layered Space-Time Architecture for Wireless Communication in a Fading Environment When Using Multi-Element Antennas," Bell Labs Technical Journal, Autumn 1996, pp. 41-59, p. 5, Line 10.

*Primary Examiner* — Ted Wang
(74) *Attorney, Agent, or Firm* — Dickinson Wright PLLC

(57) ABSTRACT

It is possible to provide a radio reception device, a radio transmission device, a radio reception method, and a radio transmission method which can improve the channel estimation accuracy and the reception quality. The radio reception device (200) includes: reception units (203, 204) which receive a data sequence added by a reference signal for channel estimation of a spatial propagation path at a predetermined interval; demodulation units (205, 206) which demodulate the data sequence; a channel estimation unit (208) which estimates a propagation path fluctuation state according to the reference signal in the data sequence and outputs a channel estimation value obtained by interpolating or extrapolating the data sequence; and a decoding processing unit (210) which decodes the data sequence by using the interpolated or extrapolated channel estimation value.

12 Claims, 22 Drawing Sheets

FOREIGN PATENT DOCUMENTS

| | | |
|---|---|---|
| JP | 2003-169036 | 6/2003 |
| JP | 2005-124125 | 5/2005 |
| JP | 2006-515481 | 5/2008 |
| WO | 2004/064295 | 7/2004 |
| WO | 2004/077728 | 9/2004 |
| WO | 2005/094023 | 10/2005 |
| WO | 2006/049282 | 5/2006 |
| WO | 2006/054697 | 5/2006 |

OTHER PUBLICATIONS

Hiroshi Ochi, et al., "OFDM system technology and MATLAB simulation Guide," Chapter 2 OFDM Modulation/Demodulaton, Tricepts, 2002, pp. 31-45, and 98, with 17 page English translation, p. 5, Line 14.

Chinese Office Action dated Jul. 2, 2012.

* cited by examiner

RADIO TRANSMISSION DEVICE, RADIO RECEPTION DEVICE, RADIO TRANSMISSION METHOD, AND RADIO RECEPTION METHOD

TECHNICAL FIELD

The present invention relates to a radio transmitting apparatus, radio receiving apparatus, radio transmitting method and radio receiving method for transmitting and receiving signals upon spatial multiplexing transmission using a multicarrier modulation scheme. In particular, the present invention relates to a radio transmitting apparatus, radio receiving apparatus, radio transmitting method and radio receiving method using channel estimation techniques and channel compensation techniques.

BACKGROUND ART

Up till now, with demands for high-capacity and high-speed radio communication, techniques are actively studied for further improving use efficiency of limited frequency resources. In particular, techniques utilizing the space domain have attracted attentions. Adaptive array antenna (adaptive antenna) is an example of these techniques.

With this antenna, by adjusting the amplitude and phase using weighting coefficients (referred to as "weight") by which received signals are multiplied, it is possible to strongly receive signals reached from a desired direction. Further, it is possible to suppress signals as interference components such as multipath interference and interference from the same channel. By this interference suppression effect, it is possible to improve communication capacity of communication systems.

Further, as other techniques utilizing the space domain, there are two techniques utilizing spatial orthogonality of channels. One of the techniques is a spatial multiplexing technique for transmitting different data sequences to the same terminal apparatus using physical channels of the same time, same frequency and same code. The following is a general example of using the spatial multiplexing techniques (e.g., see Non-Patent Document 1). That is, the transmitter and receiver each have a plurality of antennas. Further, it is possible to realize spatial multiplexing transmission in a propagation environment where the correlation of received signals is low between the antennas.

Here, upon transmission, from a plurality of antennas in the transmitter, different data sequences are transmitted on a per antenna element basis, using physical channels of the same time, same frequency and same code. Further, the antennas of the receiver demultiplex and receive the data sequences based on an estimation value (hereinafter "channel estimation value") of channel characteristics. By this means, it is possible to make transmission processing fast by using a plurality of spatial multiplexing streams, without using M-ary modulation.

Further, when the transmitter and receiver each have the same number of antennas and perform spatial multiplexing transmission, it is possible to increase the communication capacity in proportion to the number of antennas, in an environment where the S/N ratio (signal to noise ratio) is sufficiently high and where there are many scatterers between the transmitter and the receiver. As the spatial multiplexing transmission scheme, a multicarrier modulation scheme using OFDM (Orthogonal Frequency Division Multiplexing) is likely to be used.

The reason for this is as follows. That is, if the multipath delay on a radio channel is within the guard interval time, a flat fading environment is identified in subcarrier units. Therefore, multipath equalization processing is not necessary, and demultiplexing processing of signals subjected to spatial multiplexing transmission is reduced.

On the other hand, upon reception, signals received by the receiver's antennas are frequency-transformed to baseband signals and further subjected to OFDM demodulation processing.

Here, the multicarrier modulation scheme is a transmission scheme using a plurality of subcarriers. Input data signals to the subcarriers are modulated into subcarrier signals by M-ary QAM modulation and such. OFDM, in which the frequencies of subcarriers are orthogonal, collectively transforms subcarrier signals of different frequencies using an FFT (Fast Fourier Transform) circuit.

By this means, after subcarrier signals are transformed into time domain signals, the transformed signals are frequency-transformed into carrier frequency bands and transmitted from antennas. OFDM modulation and OFDM demodulation are disclosed in Non-Patent Document 2.

Conventionally, in such a situation, channel estimation values are acquired by two-step channel estimation processing (e.g., see Patent Document 1). To be more specific, first, a received signal of a reference signal for channel estimation is divided per transmission antenna subset. Further, as the first step of channel estimation, the first step of channel estimation is performed based on the reference sequence. By this means, a tentative estimation value of the channel response in the first dimension (e.g., subcarrier direction) is calculated per transmission antenna subset using interpolation processing.

Next, as the second step of the channel estimation, a channel estimation is performed in a different dimension direction (e.g., time domain) using the tentative estimation value interpolated in the first dimension direction. Thus, a channel estimation value of a data part between a reference signal and a tentative estimation value is acquired by interpolation and channel estimation values of other data parts are acquired using extrapolation uniformly. By this means, it is possible to acquire a channel estimation value per antenna subset of transmission antennas.

Patent Document 1: Japanese Patent Application Laid-open No. 2006-515481

Non-Patent Document 1: G. J. Foschini, "Layered space-time architecture for wireless communication in a fading environment when using multi-element antennas," Bell Labs Tech. J., pp. 41-59, Autumn 1996

Non-Patent Document 2: Hiroshi Ochi, Kenji Ueda, "OFDM system technology and MATLAB simulation Guide," Triceps, 2002

DISCLOSURE OF INVENTION

Problem to be Solved by the Invention

Generally, the accuracy of a channel estimation value acquired by extrapolation is lower than the accuracy of a channel estimation value acquired by interpolation. Consequently, the channel estimating method disclosed in Patent Document 1 uniformly applies channel estimation values by extrapolation, thereby deteriorating the accuracy of channel estimation and received quality.

It is therefore an object of the present invention to provide a radio transmitting apparatus, radio receiving apparatus, radio transmitting method and radio receiving method for improving the accuracy of channel estimation and improving received quality.

Means for Solving the Problem

To solve the above-noted problem, the radio receiving apparatus of the present invention employs a configuration having: a receiving section that receives a data sequence in which a reference signal for channel estimation in a spatial channel is provided at predetermined intervals; a channel estimating section that estimates a condition of channel variation based on the reference signal in the received data sequence, and outputs one of a channel estimation value acquired by interpolation and a channel estimation value acquired by extrapolation with respect to the data sequence based on the condition of variation; and a demodulation and decoding processing section that performs demodulation and decoding processing on the data sequence using the one of the channel estimation value by the interpolation and the channel estimation value by the extrapolation.

Further, to solve the above-noted problem, the radio transmitting apparatus of the present invention using a transmission format in which a subframe comprises a plurality of orthogonal frequency division multiplexing symbols, employs a configuration having: a generating section that generates a reference signal for channel estimation of a spatial channel; an assigning section that assigns a data signal to a subcarrier in an orthogonal frequency division multiplexing symbol; a power adjusting section that adjusts transmission power of the reference signal such that the transmission power of the reference signal is greater than transmission power of the data signal; a reference signal multiplexing section that allocates the reference signal having the transmission power adjusted in the power transmission adjusting section at predetermined intervals in a frequency domain or a time domain of subcarriers in the orthogonal frequency division multiplexing symbol; and a transmitting section that performs an orthogonal frequency division multiplexing modulation with respect to the data signal and reference signal assigned to the subcarriers in the orthogonal frequency division multiplexing symbol and transmits an acquired orthogonal frequency division multiplexing modulation signal.

Further, to solve the above-noted problem, the radio receiving method of the present invention includes the steps of: receiving a data sequence in which a reference signal for channel estimation in a spatial channel is provided at predetermined intervals; demodulating the data sequence; estimating a condition of channel variation based on the reference signal in the received data sequence and outputting one of a channel estimation value acquired by interpolation and a channel estimation value acquired by extrapolation with respect to the data sequence based on the condition of variation; and performing demodulation and decoding processing on the data sequence using the one of the channel estimation value by the interpolation and the channel estimation value by the extrapolation.

Further, to solve the above-noted problem, the radio transmitting method of the present invention using a transmission format in which a subframe comprises a plurality of orthogonal frequency division multiplexing symbols, includes the steps of: generating a reference signal for channel estimation in a spatial channel; assigning a data signal to a subcarrier in an orthogonal frequency division multiplexing symbol; adjusting transmission power of the reference signal such that the transmission power of the reference signal is greater than transmission power of the data signal; allocating the reference signal of the transmission power adjusted in the power transmission adjusting step at predetermined intervals in a frequency domain or time domain of subcarriers in the orthogonal frequency division multiplexing symbol; and performing an orthogonal frequency division multiplexing modulation with respect to the data signal and reference signal assigned to the subcarriers in the orthogonal frequency division multiplexing symbol and transmitting the acquired orthogonal frequency division multiplexing modulation signal.

Advantageous Effect of the Invention

According to the present invention, a data sequence is decoded using channel estimation values acquired by interpolation or by extrapolation, based on the condition of channel variation. By this means, it is possible to improve the accuracy of channel estimation and improve received quality.

BEST MODE FOR CARRYING OUT THE INVENTION

Embodiments of the present invention will be explained below with reference to the accompanying drawings.

Embodiment 1

The Configuration of a Radio Transmitting Apparatus

First, the configuration of radio transmitting apparatus 100 will be explained.

Figure 1:
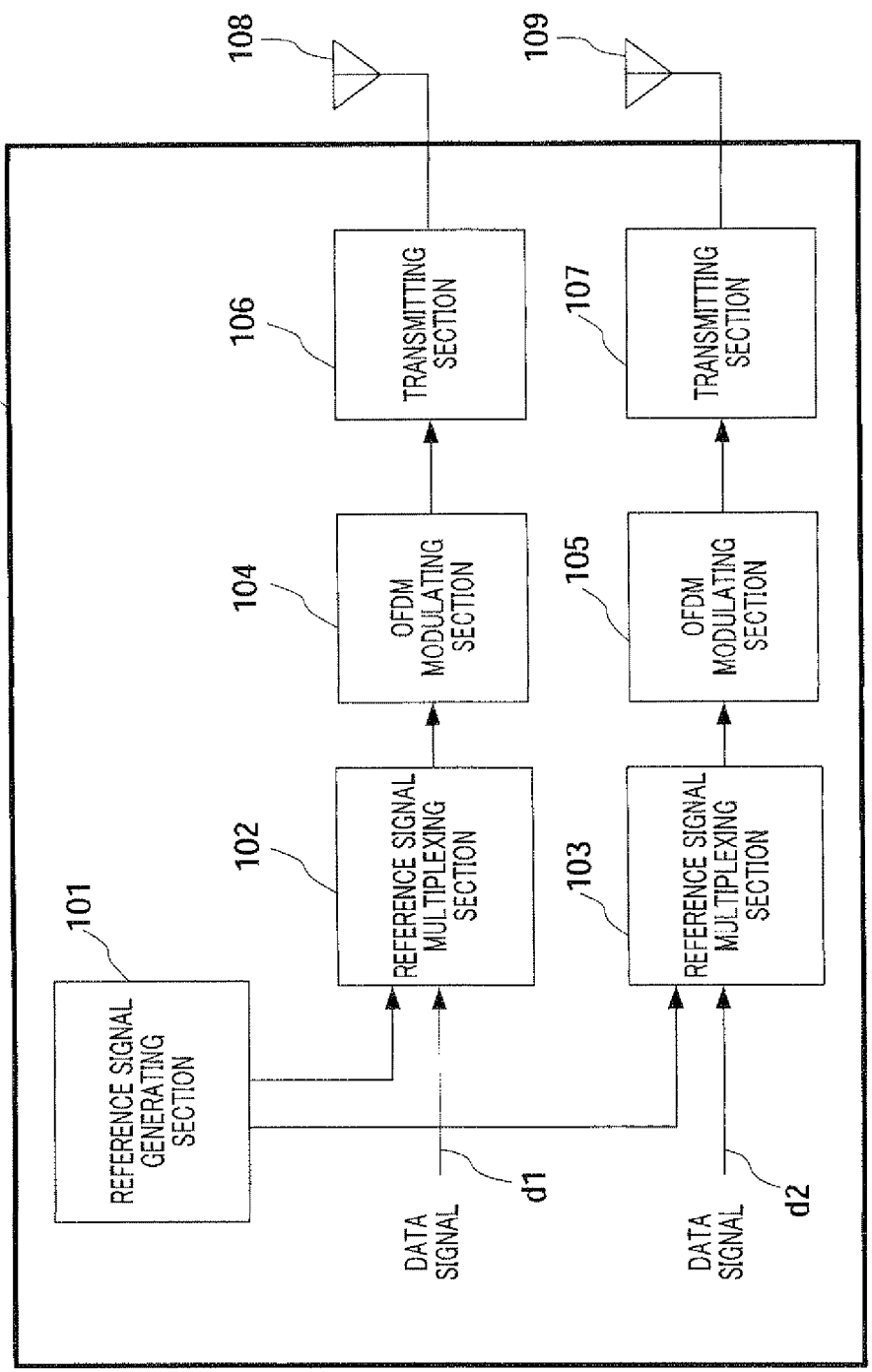
FIG. 1 illustrates a configuration example of a radio transmitting apparatus according to Embodiment 1 of the present invention.

FIG. 1 illustrates a configuration example of radio transmitting apparatus (radio communication apparatus) 100 according to Embodiment 1 of the present invention. Foe example, radio transmitting apparatus 100 adopting an OFDM multicarrier transmission scheme will be explained below.

In FIG. 1, radio transmitting apparatus 100 is provided with reference signal generating section 101, reference signal multiplexing sections 102 and 103, OFDM modulating sections 104 and 105, transmitting sections 106 and 107, and transmission antennas 108 and 109. Although a case will be explained with the present embodiment where the number of transmission antennas is two (the number of transmission antennas Nt=2), it is possible to change the number of transmission antennas to one or to three or more.

Reference signal generating section 101 generates reference signals comprised of predetermined sequence signals known on the receiving side, and outputs the reference signals to reference signal multiplexing sections 102 and 103. The reference signals are used for channel estimation.

Reference signal multiplexing section 102 receives as input data signal d1 and the above-noted reference signal, and multiplexes the reference signal. Data signals d1 and d2 are formed including a predetermined broadcast signal and control signal data.

Further, although the present embodiment uses FDM (Frequency Division Multiplexing) as a multiplexing method, the present embodiment is not limited to this. For example, it is possible to perform multiplexing using TDM (Time Division Multiplexing) and CDM (Code Division Multiplexing).

Figure 2:
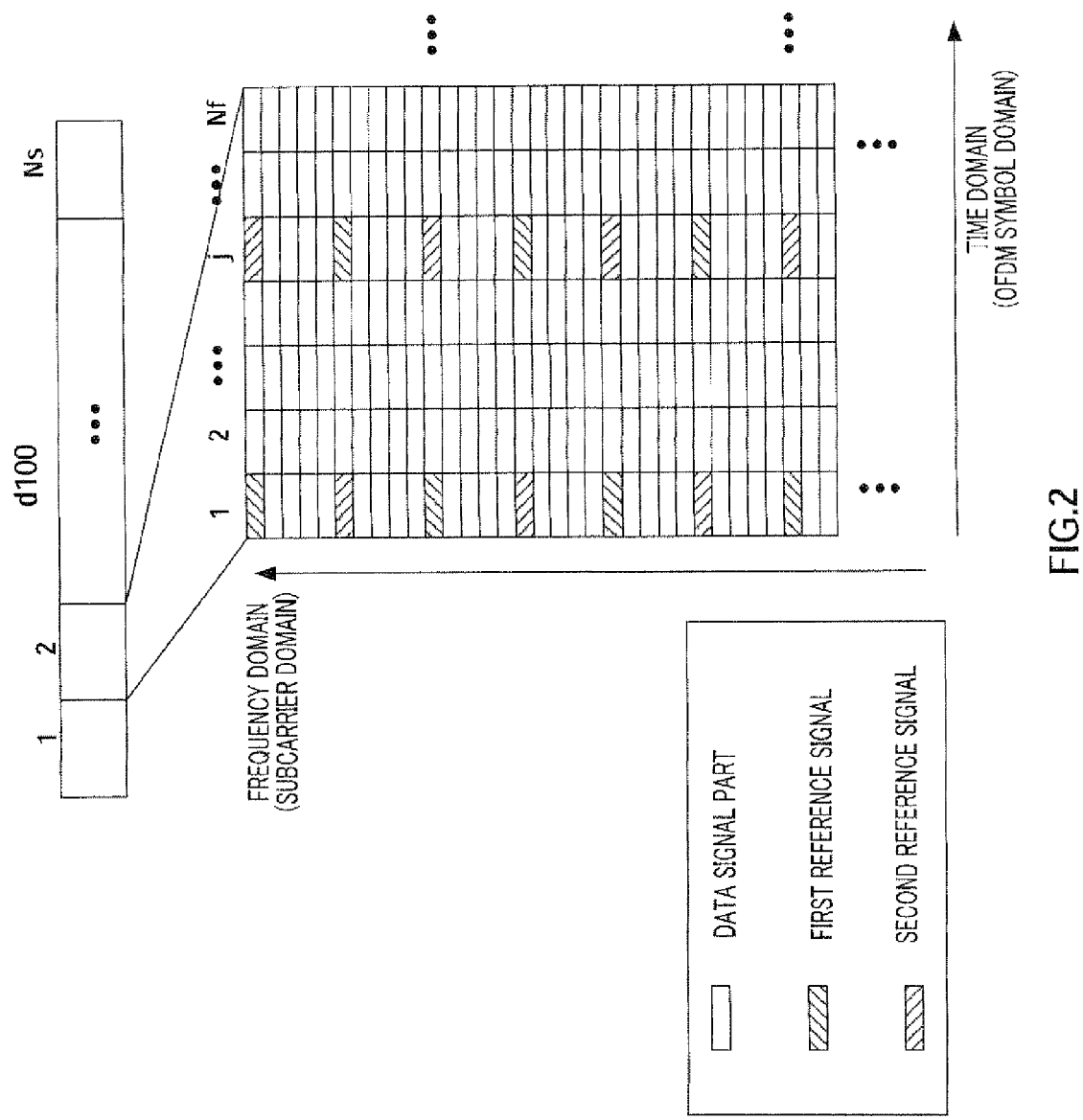
FIG. 2 illustrates a frame configuration example of a multiplex signal in a reference signal multiplexing section.

FIG. 2 shows an example of an output signal (data sequence) of reference signal multiplexing section 102. Further, reference signal multiplexing section 103 performs multiplexing in the same way as reference signal multiplexing section 102.

The output signal in FIG. 2, that is, multiplex signal d100, is formed with frames including a plurality of (Ns) subframes. Here, one subframe includes Nf OFDM symbols. Subframes are formed including reference signals and data signal parts including control signals other than the reference signals.

The reference signals are inserted in the subcarrier direction (frequency domain) and time domain (OFDM symbol direction) at predetermined intervals (i.e., intermittently). One OFDM symbol includes a plurality of (Nc) subcarriers.

The positions in which reference signals are inserted vary according to transmission antennas for transmission. For example, when reference signals are inserted in a transmission signal from another transmission antenna, the subcarriers are made null carriers that are not used for transmission. By this means, by transmitting reference signals from different antennas using different subcarriers, it is possible to perform FDM (Frequency Division Multiplexing) upon spatial multiplexing and perform demultiplexing and receiving upon reception.

Returning to FIG. 1, OFDM modulating sections 104 and 105 receives as input the output signals of the reference signal multiplexing sections and perform OFDM modulation, that is, OFDM modulating sections 104 and 105 receives as input multiplex signals and perform OFDM modulation. To be more specific, OFDM modulating sections 104 and 105 perform IFFT (Inverse Fast Fourier Transform) processing to transform subcarrier signals into time domain signals. Further, OFDM modulating sections 104 and 105 attach guard intervals (GIs) to the time domain signals as a countermeasure for multipath, and output the results. Here, the OFDM modulation method is as disclosed in Non-Patent Document 1.

Transmitting sections 106 and 107 perform band limit processing on the output signals from OFDM modulating sections 104 and 105, respectively, using band limit filters (not shown). Further, transmitting sections 106 and 107 frequency-transform of the signals after band limit processing, to a predetermined carrier frequency. Further, transmitting sections 106 and 107 amplify the signals after frequency transformation using an amplifier (not shown) and output the results.

Transmission antennas 108 and 109 emit data sequences that are the outputs of transmitting sections 106 and 107 to the air, respectively. By this means, radio receiving apparatus 200 receives the data sequences.

[The Configuration of the Radio Receiving Apparatus]

Next, the configuration of radio receiving apparatus 200 will be explained.

Figure 3:
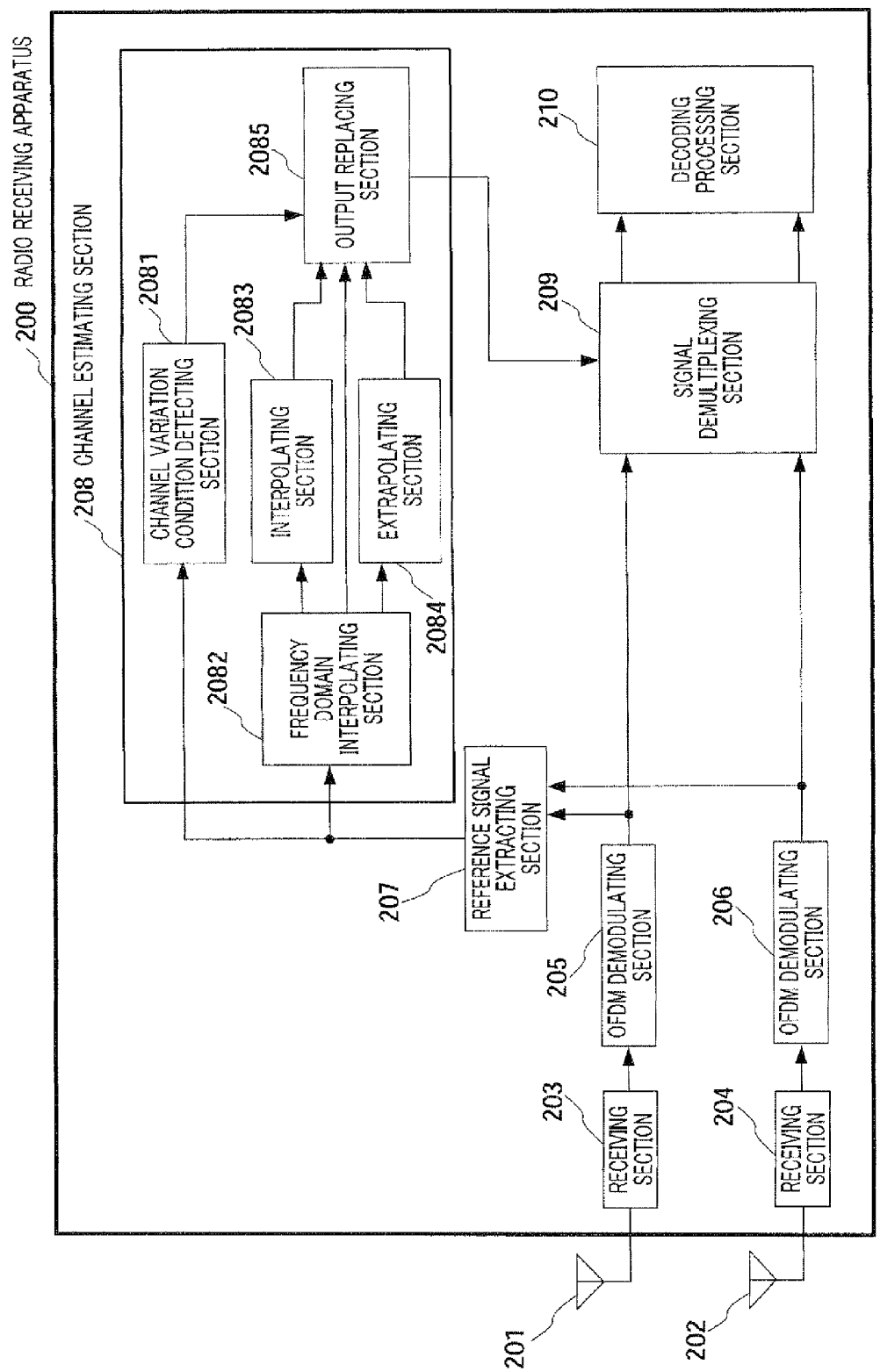
FIG. 3 illustrates a configuration example of a radio receiving apparatus according to Embodiment 1.

FIG. 3 illustrates a configuration example of radio receiving apparatus (radio communication apparatus) 200 according to Embodiment 1 of the present invention. For example, a case will be explained below where radio receiving apparatus 200 adopts an OFDM multicarrier transmission scheme.

In FIG. 3, radio receiving apparatus 200 is provided with receiving antennas 201 and 202, receiving sections 203 and 204, and OFDM demodulating sections 205 and 206. Further, radio receiving apparatus 200 is provided with reference signal extracting section 207, channel estimating section 208, signal demultiplexing section 209 and decoding processing section (demodulation and decoding processing) 210. A case will be explained with the present embodiment where the number of receiving antennas is two (the number of receiving antennas Nt=2), it is possible to change the number of receiving antennas to three or more.

Receiving antennas 201 and 202 receive a high-frequency signal of a desired carrier frequency band. Receiving sections 203 and 204 perform amplification processing, band limit processing and frequency transform processing on the high-frequency signals received at antennas 201 and 202. Further, complex baseband signals comprised of in-phase signals and quadrature-phase signals from received antennas 201 and 202 are outputted to OFDM demodulating sections 205 and 206, respectively.

OFDM demodulating sections 205 and 206 perform time and frequency synchronization processing, GI (Guard Intervals) removing processing, FFT processing and serial-to-parallel conversion processing on the inputted baseband signals. To be more specific, OFDM demodulating sections 205 and 206 perform OFDM demodulation with respect to the baseband signals. Further, OFDM demodulating sections 205 and 206 output symbol data sequences comprised of Nc subcarriers.

Further, in the following, when Y(k, is) is described, the following symbol data sequence is indicated. That is, the symbol data sequence of the fs-th subcarrier upon receiving the k-th OFDM symbol in a subframe, is shown.

Further, Y(k, fs) shows a column vector including signals received by Nr receiving antennas as components. That is, signal $y_m$(k, fs) outputted from the OFDM demodulating section that receives as input the signal received at the m-th receiving antenna, is the m-th component. However, assume k=1 to Ns and fs=1 to Nc.

For example, when radio transmitting apparatus 100 performs spatial multiplexing transmission for transmitting Nt spatial multiplexing streams, transmission sequence vector X(k, fs) having transmission sequence $X_n$(k, fs) of the fs-th subcarrier as a component is expressed by X(k, fs)=[x1(k, fs), ..., $X_{Nt}$(k, fs)]$^T$. Here, the superscript letter T represents a vector transpose operator. $X_n$(k, fs) represents the transmission sequence of the fs-th subcarrier in the k-th OFDM symbol in subframes transmitted from the transmission antennas.

If the relative delay time from preceding multipath waves on the channel is within the range of the guard interval (GI), even when a radio wave channel is in a frequency selective fading environment, a flat fading channel environment is identified in subcarrier units. In this case, frequency synchronization is performed in an ideal manner in the radio receiving apparatus.

Here, when there is no sampling clock jitter between transmission and reception, data sequence (received signal vector) Y(k, fs) of subcarrier fs of the k-th OFDM symbol, is expressed by equation 1.

(Equation 1)

$$Y(k,f_s)=H(k,f_s)X(k,f_s)+n(k,f_s) \quad [1]$$

In equation 1, H(k, fs) is a channel response matrix showing the channel variation of data sequence (transmission sequence) X(k, fs) transmitted by radio transmitting apparatus 100. Further, H(k, fs) is a matrix (hereinafter "channel matrix") comprised of Nr (the number of receiving antennas in radio receiving apparatus 200) rows and Nt (the number of antennas in radio transmitting apparatus 100) columns.

Matrix component $h_{ij}$ of the i-th row and the j-th column in H(k, fs) shows the channel variation in a case where signal $x_j$(k, fs) is received at the i-th receiving antenna in the radio receiving apparatus. Here, $x_j$(k, fs) represents the signal transmitted from the j-th transmission antenna in the radio transmitting apparatus.

Further, in equation 1, n(k, fs) represents the noise component vector of the Nt-th order. Further, n(k, fs) represents the vector having, as components, noise components attached upon reception at Nr receiving antennas in the radio receiving apparatus.

Reference signal extracting section 207 extracts an OFDM symbol containing reference signals from frame-formed signals in a subframe. Further, reference signal extracting section 207 extracts subcarriers including a reference signal from the extracted OFDM symbol.

The reference signal transmitted from the m-th transmission antenna in the j-th OFDM symbol is expressed by $g_m$(j, $G_{jm}$(s)). Further, the reception result of $g_m$(j, $G_{jm}$(s)) at the n-th receiving antenna is expressed by $y_n$(j, Gjm(s)).

$G_{jm}$(s) represents the s-th subcarrier number in the reference signal transmitted from the m-th transmission antenna in the j-th OFDM symbol. Here, s is a natural number equal to or less than Ng(j, m).

Channel estimating section 208 estimates the condition of channel variation based on the reference signals in the demodulated (received) data sequence, and, based on the condition of variation, outputs channel estimation values acquired by interpolation or extrapolation with respect to the data sequence.

To be more specific, channel estimating section 208 is provided with channel variation condition detecting section 2081, frequency domain interpolating section 2082, interpolating section 2083, extrapolating section 2084 and output replacing section (estimation value outputting section) 2085.

Frequency domain interpolating section 2082 calculates estimation value $H_e$(k, fs) of channel matrix H(k, fs) shown in equation 1, using the reference signals extracted in reference signal extracting section 207.

In the present embodiment, assume that reference signals are inserted intermittently in the subcarrier direction (frequency domain) and time domain (see FIG. 2). Therefore, with respect to subcarriers in which reference signals are not inserted, interpolation processing is performed in the subcarrier direction.

Further, with respect to OFDM symbols in which reference signals are not inserted, interpolation processing is performed in the time domain, using OFDM symbols in which reference signals are inserted and which are positioned before and after the above-noted OFDM symbol, to calculate channel estimation the values of all subcarriers and all OFDM symbols.

Further, frequency domain interpolating section 2082 calculates channel estimation value h(j, G (s)) with respect to subcarriers whereby reference signals are transmitted, in OFDM symbols including reference signals. The equation for this calculation is shown in equation 2.

[2]

$$h_{nm}(j, G_{jm}(s)) = \frac{y_n(j, G_{jm}(s))}{g_m(j, G_{jm}(s))} \quad \text{(Equation 2)}$$

In equation 2, n represents a natural number equal to or less than Nr, m represents a natural number equal to or less than Nt, and j represents the symbol number of an OFDM symbol including reference signals. $G_{jm}$(s) represents the s-th subcarrier number of a reference signal transmitted from the m-th transmission antenna in the j-th OFDM symbol. Here, assume that s is a natural number equal to or less than Ng(j, m).

Further, frequency domain interpolating section 2082 performs interpolation processing of channel estimation values in the frequency domain with respect to subcarriers not including a reference signal, based on $h_{nm}$(j, $G_{jm}$(s)) in equation 2. Further, interpolation processing of channel estimation values in the frequency domain is performed in the frequency domain or in the time domain, as disclosed in Patent Document 1.

Interpolating section 2083 estimates the first channel estimation value by interpolation. To be more specific, interpolating section 2083 calculates a channel estimation value (first channel estimation value) $h_{nm}(k1, fs)$ by interpolation, with respect to the $k_1$-th OFDM symbol not including a reference signal, using channel estimation values $h_{nm}(j_1, fs)$ and $h_{nm}(j_2, hfs)$ of OFDM symbols $(j_1<k_1<j_2)$. Further, linear interpolation, Lagrange interpolation and such are applicable as interpolation.

In FIG. 2, for example, an interpolation period means the OFDM symbol period between the second OFDM symbol and the (j−1)-th OFDM symbol.

Extrapolating section 2084 estimates a second channel estimation value by extrapolation. To be more specific, extrapolating section 2084 calculates a channel estimation value (second channel estimation value) $h_{nm}(k_2, fs)$ by extrapolating the $k_2$-th OFDM symbol not including a reference signal between OFDM symbols including reference signals, using a channel estimation value $h_{nm}(j_2, fs)$ of an OFDM symbol including reference signals before the $k_2$-th OFDM symbol $(j_3<k_2)$. Linear interpolation, Lagrange interpolation and such are applicable as extrapolation.

In FIG. 2, for example, the extrapolation period is an OFDM symbol period after the (j+1)-th OFDM symbol.

Channel variation condition detecting section 2081 detects the condition of variation $D_{nm}(j_2, j_1, fs)$ of the channel. Further, channel variation condition detecting section 2081 calculates an inner product of channel estimation values $h_{nm}(j_1, fs)$ and $h_{nm}(j_2, fs)$ of the $j_1$-th and $j_2$-th OFDM symbols including reference signals. This calculation equation is shown in equation 3 and equation 4. Here, $j_1$ is less than $j_2$.

[3]
$$D_{nm}(j_2, j_1, f_s) = \mathrm{Re}\left[\frac{h_{nm}(j_2, f_s)h_{nm}^*(j_1, f_s)}{|h_{nm}(j_1, f_s)|^2 |h_{nm}(j_2, f_s)|^2}\right] \quad \text{(Equation 3)}$$

[4]
$$D_{nm}(j_2, j_1, f_s) = \mathrm{Re}\left[\frac{h_{nm}(j_2, f_s)h_{nm}^*(j_1, f_s)}{|h_{nm}(j_1, f_s)|^2}\right] \quad \text{(Equation 4)}$$

In equations 3 and 4, asterisk (*) represents the complex conjugate operator and Re[x] represents the real part of x $(j_1 \neq j_2)$.

According to equations 3 and 4, when the condition of variation $D_{nm}(j_2, j_1, fs)$ of the channel becomes less than one, fading variation of the channel increases. Further, when $D_{nm}(j_2, j_1, fs)$ approaches one, the channel variation can be decided less.

Further, it is possible to detect the condition of variation $D_{nm}(j_2, j_1, fs)$ on a per subcarrier basis or use an average value of the condition of variation of a plurality of subcarriers as $D_{nm}(j_2, j_1, fs)$. Alternatively, this detection can be performed using part of subcarriers instead of all subcarriers, or it is possible to group subcarriers and detect an average value per group as a representative value. Further, it is possible to group subcarriers and detect subcarriers around the center subcarrier of the group as a representative value of the group.

Output replacing section 2085 selects a channel estimation value by interpolation or a channel estimation value by extrapolation, based on the condition of variation $D_{nm}(j_2, j_1, fs)$ in the channel and outputs the definitive channel estimation value.

To be more specific, in a case of an OFDM symbol including reference signals, output replacing section 2085 outputs the calculation results (channel estimation values) in frequency domain compensating section 2082.

By contrast, in a case of the k-th OFDM symbol not including a reference signal (between OFDM symbols including reference signals before and after the k-th OFDM symbol in the time domain), output replacing section 2085 outputs the calculation results (channel estimation values) in interpolating section 2083 as is, regardless of the condition of variation in channel variation condition detecting section 2081.

Alternatively, in a case where there are no OFDM symbols including reference signals after the k-th OFDM symbol not including a reference signal in a subframe in the time domain (in a case where the OFDM symbol is not sandwiched between OFDM symbols including reference signals), output replacing section 2085 performs replacement processing of the channel estimation values as shown below, based on the detection result in channel variation detecting section 2081, that is, based on the condition of variation $D_{nm}(j_2, j_1, fs)$.

That is, when the condition of variation $D_{nm}(j_2, j_1, fs)$ is greater than a predetermined value Ld (predetermined level), output replacing section 2085 decides that the channel variation is relatively insignificant, and outputs the channel estimation value $h_{nm}(k, fs)$ acquired in interpolating section 2083. Here, the maximum natural number or a value around the number in j2<k is used as $h_{nm}(k, fs)$.

By contrast, when the condition of variation $D_{nm}(j_2, j_1, fs)$ is equal to or less than predetermined value Ld, output replacing section 2085 decides that the channel variation is relatively significant, and outputs the channel estimation value $h_{nm}(k, fs)$ acquired in extrapolating section 2084.

Signal demultiplexing section 209 performs demultiplexing and receiving processing of signals after spatial multiplexing transmission, using the channel estimation value that is the output of channel estimating section 208 (i.e., the interpolating section or extrapolating section). This demultiplexing and receiving processing adopts the method disclosed in Non-Patent Document 1.

For example, upon performing demultiplexing and reception using the ZF (Zero Forcing) method, signal demultiplexing section 209 calculates an inverse matrix with respect to the channel estimation value $H_e(k, fs)$ per subcarrier acquired in channel estimating section 208, and demultiplexes and receives transmission symbol sequence X(k, fs). The equation for a calculation of the inverse matrix is shown in equation 5. Further, although a signal demultiplexing method based on the ZF method has been explained with the present embodiment, the present embodiment is not limited to this, and, for example, it is possible to adopt other methods such as MMSE (Minimum Mean Square Error) and MLD (Maximum Likelihood Detection).

(Equation 5)
$$X(k,f_s) = H_e(k,f_s)^{-1} Y(k,f_s) \quad [5]$$

Decoding processing section 210 performs decoding processing of the data sequence using a channel estimation value by interpolation or by extrapolation outputted from output replacing section 2085.

To be more specific, decoding processing section 210 performs receiving processing of the output signal of signal demultiplexing section 209 for restoring transmission bit sequences, based on coding modulation information of transmission signals included in the transmitted subframes (control signal). Upon this receiving processing, decoding processing section 210 performs demapping processing, deinterleaving processing, correction decoding processing and such. Here, the demapping processing refers to processing for changing a symbol data sequence by a predetermined modulation scheme into a bit data sequence.

The deinterleaving processing refers to processing for restoring the bit order by performing a reverse operation of the interleaving performed in, for example, radio transmitting apparatus 100. The error decoding processing refers to processing for performing error correction decoding with respect to the inputted bit data sequence.

As described above, according to the present embodiment, a data sequence (multiplex signal) to which reference signals are attached at predetermined intervals is received at a plurality of receiving antennas 201 and 202, and demodulated in OFDM demodulating sections 205 and 206. Further, channel estimating section 208 estimates the condition of channel variation $D_{nm}(j_2, j_1, fs)$ based on the reference signals in the demodulated (received) data sequence, and outputs a channel estimation value acquired by interpolation or by extrapolation with respect to the data sequence based on the condition of variation $D_{nm}(j_2, j_1, fs)$. Further, decoding processing section 210 performs iterative decoding processing using the channel estimation value by interpolation or by extrapolation.

In this case, channel variation condition detecting section 2081 detects the condition of channel variation (see equations 3 and 4). Further, if the channel variation due to fading and such is less than a predetermined level (predetermined value), output replacing section 2085 replaces the channel estimation value of an OFDM symbol (e.g., a symbol after the (j+)-th symbol in FIG. 2) acquired by extrapolation with a channel estimation value acquired by interpolating an OFDM symbol (e.g., the (i−1)-th symbol in FIG. 2) before the above-noted OFDM symbol, and outputs the result.

By contrast, if the channel variation due to fading and such is greater than a predetermined level, output replacing section 2085 outputs the channel estimation value by extrapolation as is, without replacing the channel estimation value.

According to the above-described explanations, a channel estimation value acquired by extrapolation providing the lower accuracy of channel estimation than interpolation, is used as little as possible, so that it is possible to make channel estimation error less, thereby improving received quality.

[Simulation Parameter and Result]

Further, CNR (Carrier to Noise Ratio) and PER (Packet Error Rate) (here, CNR and PER represent received quality) are simulated upon using the channel estimation value acquired by the present invention. As the simulation parameters, 2×2 MIMO (Multiple Input Multiple Output), demultiplexing algorithm by MLD, 64QAM modulation scheme, turbo codes (coding rate R=3/4) and typical urban six-path model are used.

FIG. 4 illustrates this simulation result. Here, three types of patterns under the same simulation parameters, are illustrated. That is, cases are shown where an ideal channel estimating method is used, the channel estimating method of the present invention is used, and a conventional channel estimating method (i.e., a method uniformly using a channel estimation value by interpolation) is used as a comparison example.

Figure 4A:
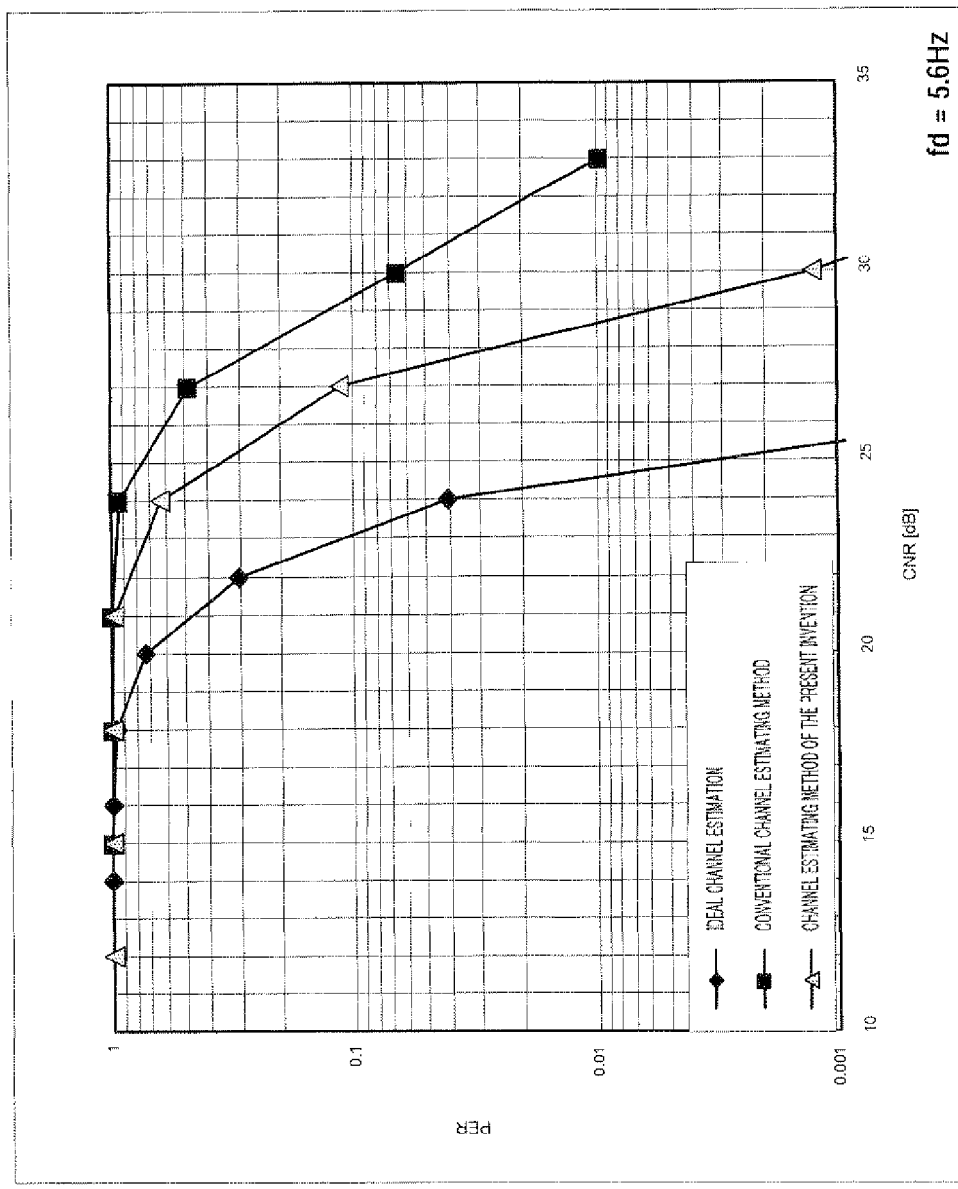
FIG. 4A illustrates a simulation result according to Embodiment 1.
Figure 4B:
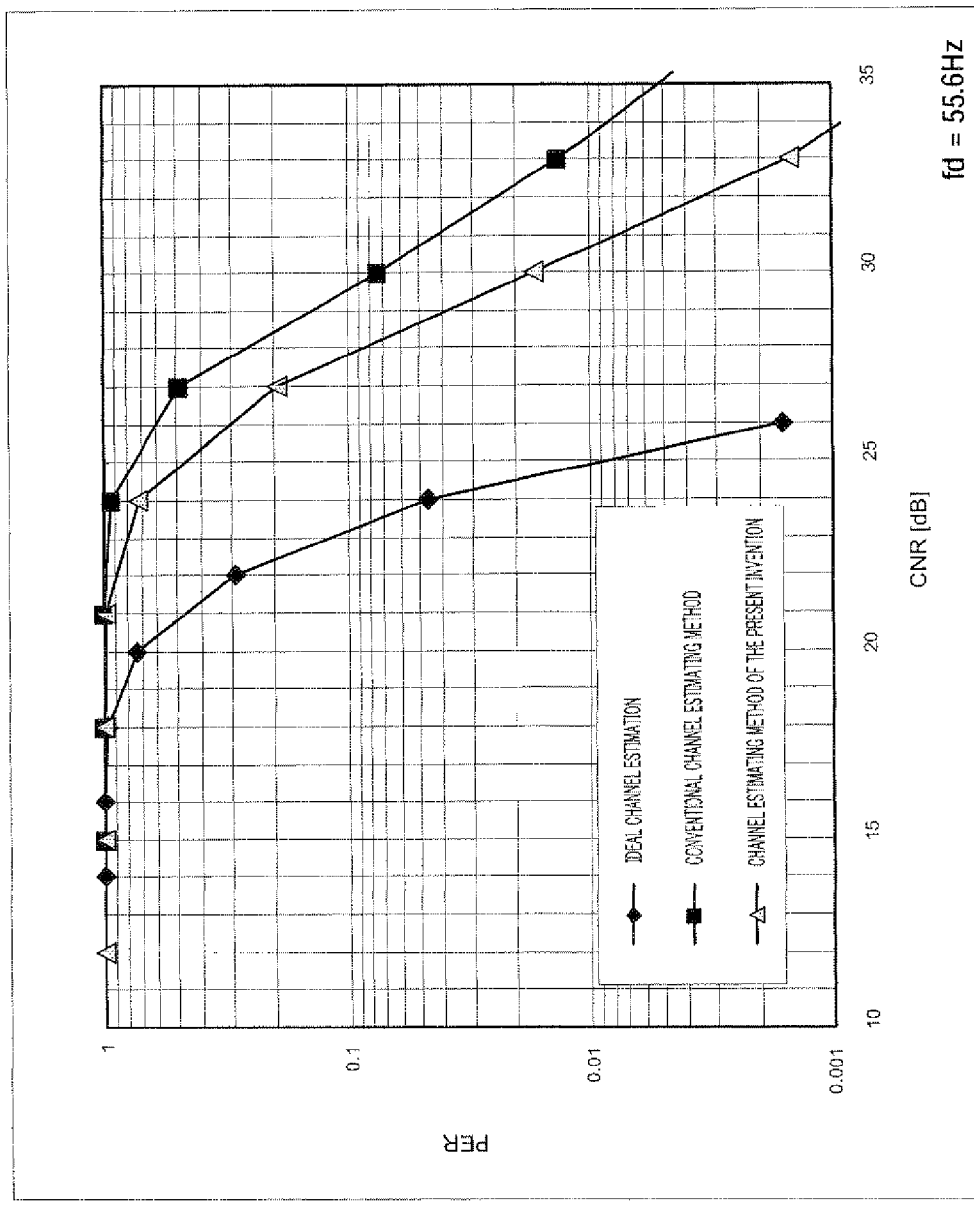
FIG. 4B illustrates another simulation result according to Embodiment 1.

FIG. 4A illustrates a simulation result in a case where the Doppler fading frequency fd of 5.6 Hz holds and FIG. 4B illustrates a simulation result in a case where the Doppler fading frequency fd of 55.6 Hz holds.

According to FIG. 4A and FIG. 4B, compared to the conventional channel estimating method, the channel estimating method of the present invention improves the PER characteristics and receiving performance. For example, in the channel estimating method of the present invention, CNR increases approximately by 2 dB in PER=10% (PER=0.1) compared to the conventional method. Therefore, it is obvious that an improvement effect of receiving performance is acquired.

[Transform Example of a Radio Transmitting Apparatus and Radio Receiving Apparatus]

Although a case has been described with the present embodiment where radio transmitting apparatus 100 and radio receiving apparatus 200 perform spatial multiplexing transmission, spatial multiplexing transmission needs not be performed. A configuration example of radio transmitting apparatus 100A and radio receiving apparatus 200A will be explained below.

Figure 5:
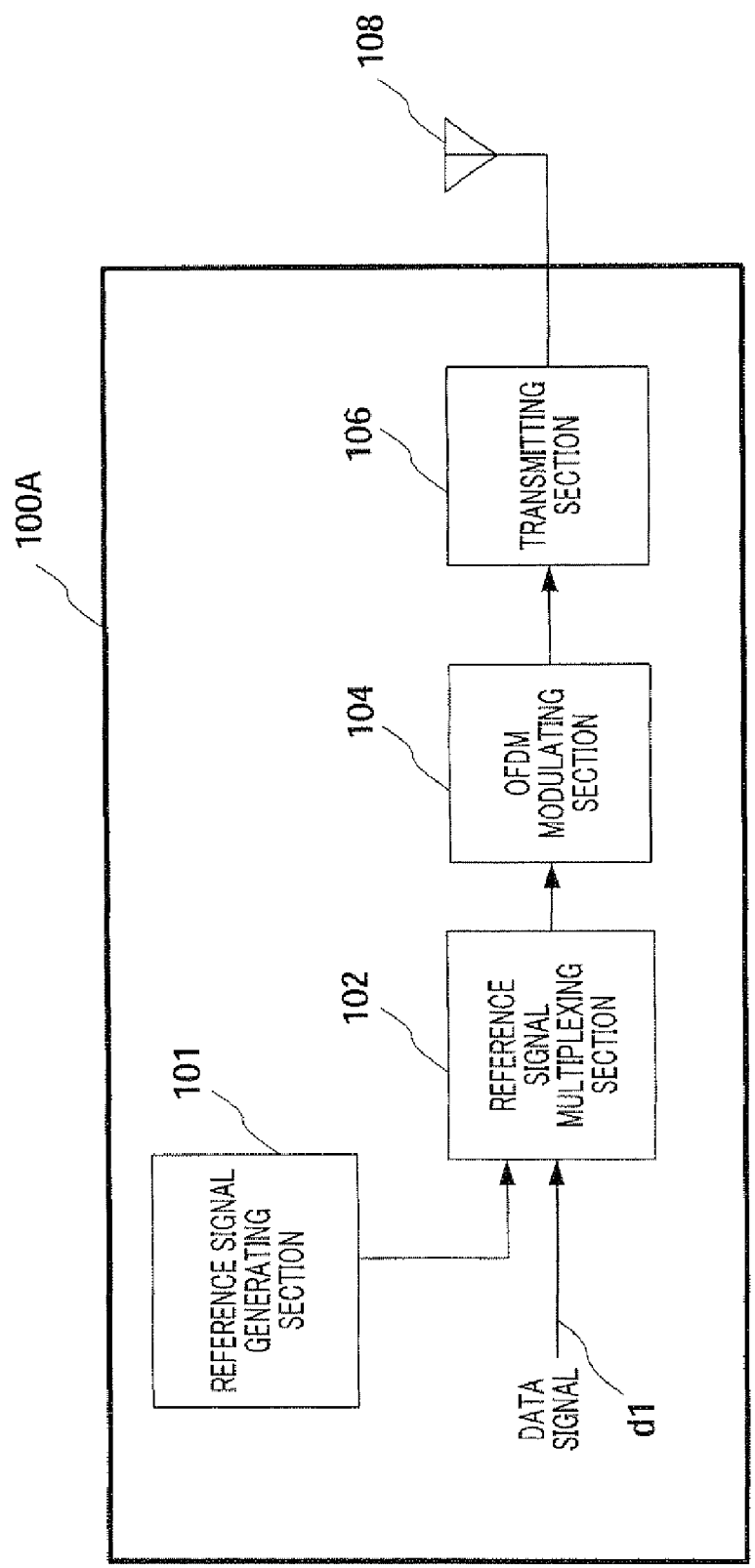
FIG. 5 illustrates another configuration example of a radio transmitting apparatus according to Embodiment 1.

FIG. 5 illustrates a configuration example of radio transmitting apparatus 100A.

Unlike radio transmitting apparatus 100 in FIG. 1, radio transmitting apparatus 100A in FIG. 5 is provided with reference signal generating section 101, reference signal multiplexing section 102, OFDM modulating section 104, transmitting section 106 and only one transmission antenna 108.

Reference signal generating section 101 generates a reference signal comprised of a predetermined sequence signal and outputs the reference signal to reference signal multiplexing section 102. Further, as in Embodiment 1, reference signal multiplexing section 102 receives as input data signal d1 and the above-noted reference signal, multiplexes the reference signal and outputs the result.

Figure 6:
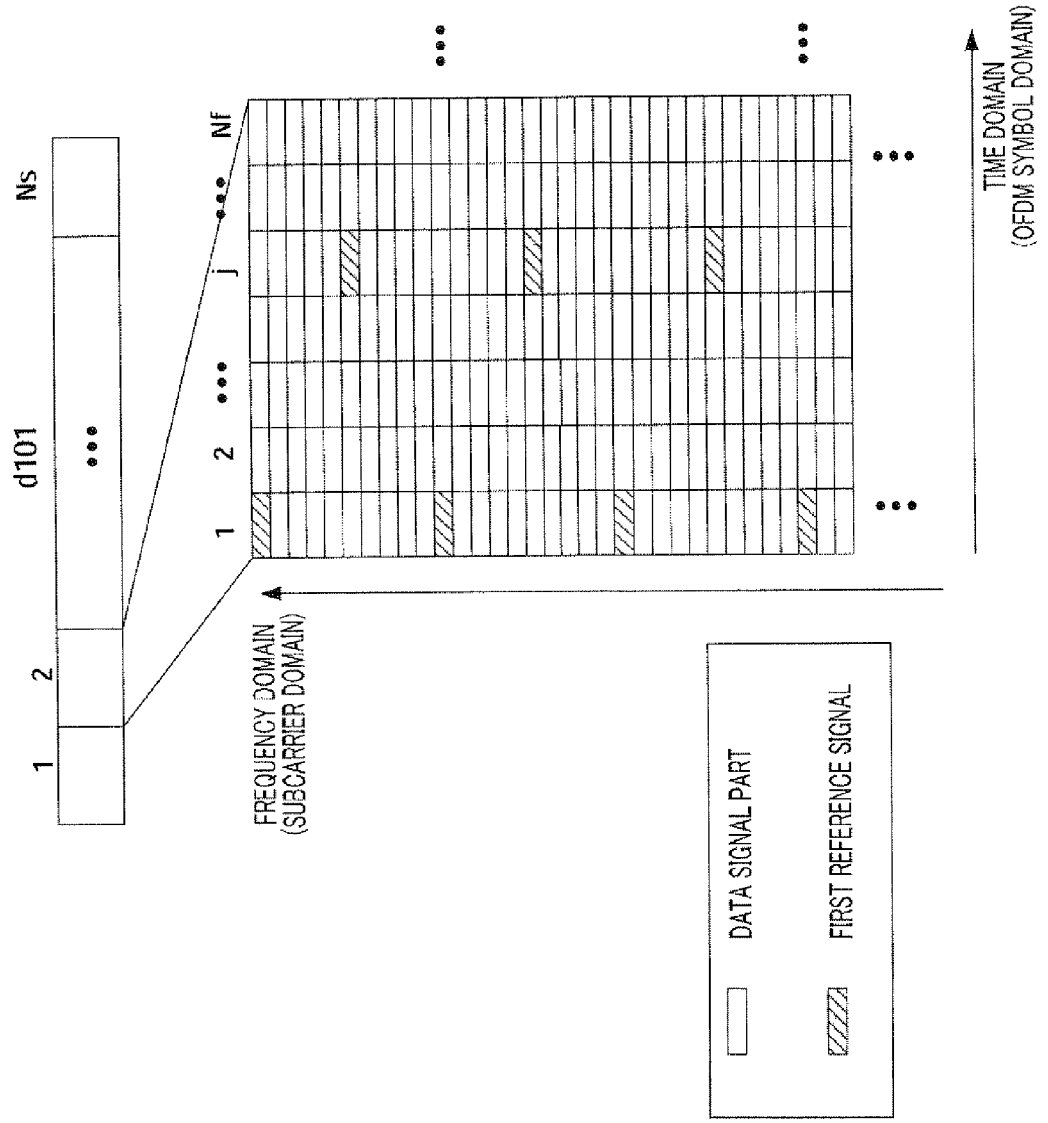
FIG. 6 illustrates another frame configuration of a multiplex signal in a reference signal multiplexing section.

FIG. 6 illustrates an example of the multiplex signal. Unlike in FIG. 2, only the first reference signals are inserted in multiplex signal d101 in FIG. 6. The first reference signals are inserted at predetermined intervals in the frequency domain and in the time domain.

The other components of radio transmitting apparatus 100A are the same as the components of radio transmitting apparatus 100 in FIG. 1.

Figure 7:
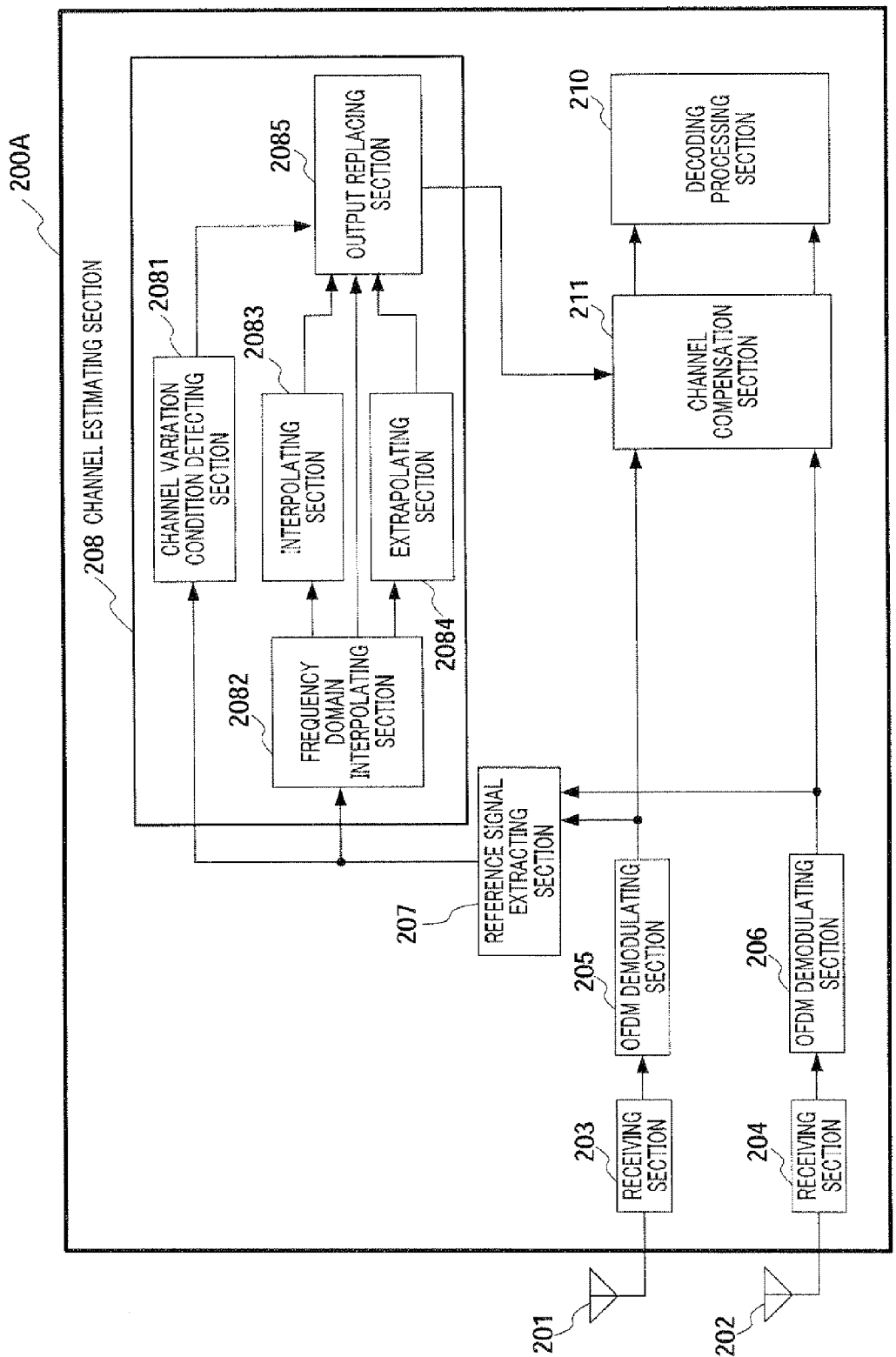
FIG. 7 illustrates another configuration example of a radio receiving apparatus according to Embodiment 1.

FIG. 7 illustrates a configuration example of radio receiving apparatus 200A. A case will be explained where the number of receiving antennas of radio receiving apparatus 200A is two (the number of receiving antennas Nt=2), it is possible to change the number of antennas to one or to three or more.

In FIG. 7, radio receiving apparatus 200A includes channel compensating section 211 instead of signal demultiplexing section 209 of radio receiving apparatus 200 in FIG. 3. Further, channel estimating section 208 in FIG. 7 uses the above-noted Nt and Nr as Nt=1 and Nr=1.

Channel compensating section 211 compensates the channel variation of the signal received at receiving antenna 201, using the channel estimation value that is an output of channel estimating section 208 (output replacing section 2085).

For example, upon performing demultiplexing and reception by ZF, channel compensating section 211 compensates the channel variation with respect to the channel estimation value per subcarrier, $H_e(k, fs)$, acquired in channel estimating section 208, using the equation for calculation shown in equation 6.

[6]

$$X(k, f_s) = \frac{H_e(k, f_s)^H Y(k, f_s)}{|H_e(k, f_s)|^2}$$

(Equation 6)

Thus, after channel compensating section 211 compensates the channel variation, decoding processing section 210 performs receiving processing of the output signal of channel compensating section 211 for restoring the transmission bit sequence. By this receiving processing, it is possible to improve receiving performance.

Further, according to Embodiment 1 (including variation examples), although channel estimating section 208 calculates estimation values using reception results of OFDM symbols including reference signals in subframes, the present embodiment is not limited to the above-described calculation method. For example, channel estimating section 208 may calculate a channel estimation value, further using the reception result of the first OFDM symbol including reference signals in the next subframe.

In this case, a channel estimation value of an OFDM symbol between a channel estimation value calculated based on the reception result of the last OFDM symbol including reference signals in a subframe and a channel estimation value calculated based on the reception result of the first OFDM symbol including reference signals in the next subframe, is calculated by interpolation. By this means, it is possible to improve the accuracy of channel estimation and improve received quality.

Further, according to Embodiment 1 (including variation examples), first, channel variation condition detecting section 2081 detects the condition of variation of channel estimation values in the time domain. Further, when the condition of variation is insignificant, output replacing section 2085 replaces the channel estimation value of an OFDM symbol calculated using a channel estimation value acquired by extrapolation, with a channel estimation value acquired by interpolation. However, not only channel estimation values in the time domain but also channel estimation values in the frequency domain can be used as channel estimation values used for detecting the condition of variation.

In this case, first, channel variation condition detecting section 2081 detects the condition of variation of channel estimation values in the frequency domain. Further, when the condition of variation is insignificant, output replacing section 2085 replaces the channel estimation value of an OFDM symbol calculated using a channel estimation value acquired by extrapolation in the frequency domain, with a channel estimation value acquired by interpolation in the frequency domain. With this replacing method, it is possible to improve channel estimation in the frequency domain and improve received quality.

Embodiment 2

According to Embodiment 2, channel estimation is performed separately between the phase component and amplitude component, to improve the accuracy of channel estimation. Therefore, the configuration of the channel estimating section will be mainly explained below.

Figure 8:
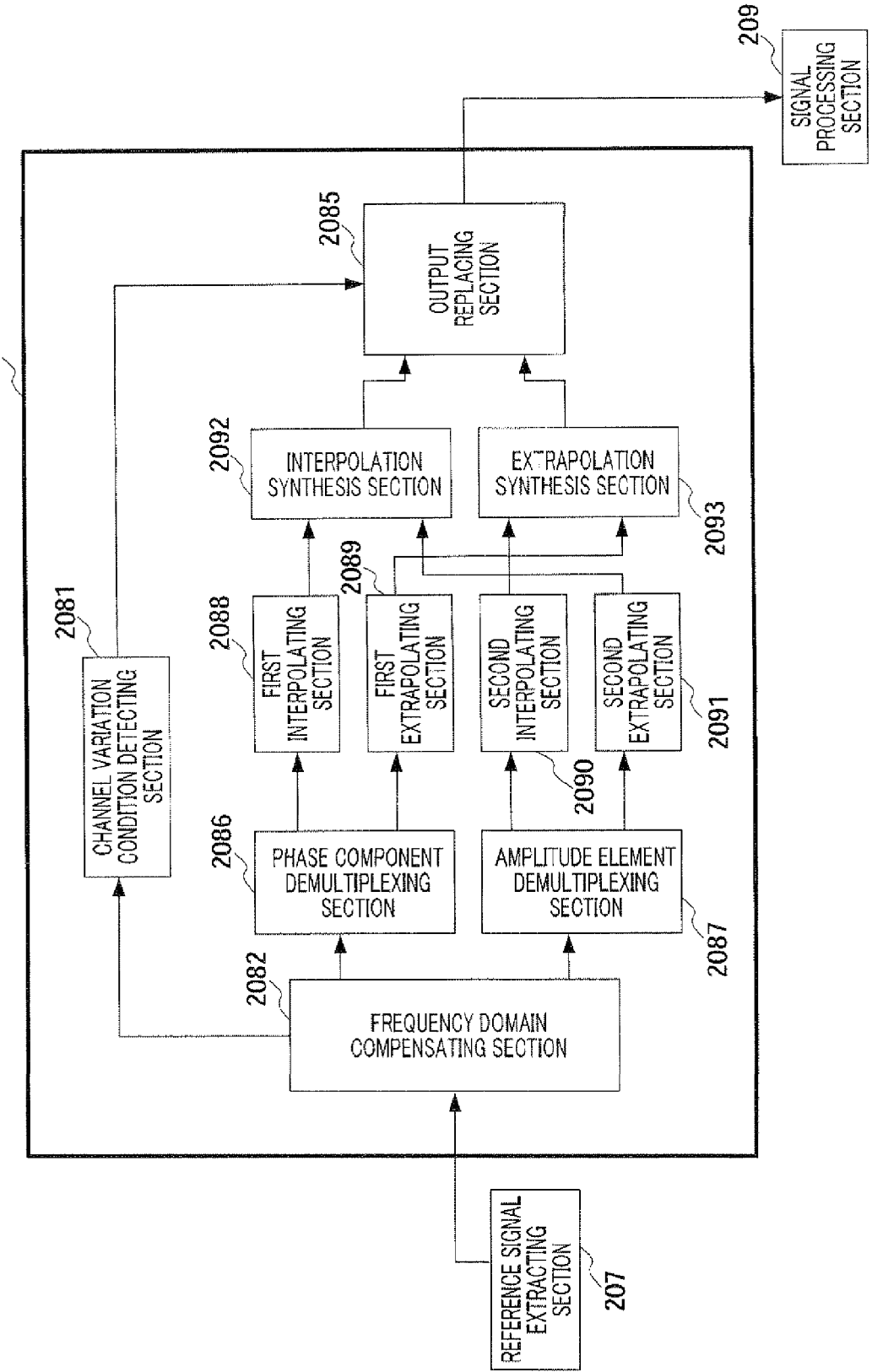
FIG. 8 illustrates a configuration example of a channel estimating section of a radio receiving apparatus according to Embodiment 2 of the present invention.

FIG. 8 illustrates a configuration example of channel estimating section 208A in the radio receiving apparatus according to Embodiment 2 of the present invention.

Channel estimating section 208A in FIG. 8 calculates an estimation value $H_e(k, fs)$ of channel matrix $H(k, fs)$ shown in equation 1, using reference signals extracted in reference signal extracting section 207.

Assume that the reference signals according to the present embodiment are inserted intermittently in the frequency domain and in the time domain. Here, first, channel estimating section 208A performs interpolation processing in the frequency domain with respect to subcarriers in which a reference signal is not inserted.

Further, channel estimating section 208A performs interpolation processing in the time domain with respect to an OFDM symbol in which reference signals are not inserted, using OFDM symbols in which reference signals are inserted before and after the OFDM symbol. Further, channel estimating section 208A calculates the channel estimation values of OFDM symbols for all subcarriers.

To be more specific, channel estimating section 208A is provided with frequency domain interpolating section 2082, phase component demultiplexing section 2086, amplitude component demultiplexing section 2087, first interpolating section (phase component time domain interpolating section) 2088 and first extrapolating section (phase component time domain extrapolating section) 2089, and further provided with second interpolating section (amplitude component time domain interpolating section) 2090, second extrapolating section (amplitude component time domain extrapolating section) 2091, interpolation combining section 2092, extrapolation combining section 2093 and output replacing section 2085.

Frequency domain interpolating section 2082 calculates channel estimation value $h_{nm}(j, G_{jm}(s))$ with respect to a subcarrier whereby a reference signal is transmitted, in an OFDM symbol including the reference signal. The equation for this calculation is as shown in equation 2. Further, frequency domain interpolating section 2082 performs interpolation processing on channel estimation values in the frequency domain, with respect to subcarriers not including a reference signal, based on $h_{nm}(j, G_{jm}(s))$ in equation 2.

Further, n is a natural number equal to or less than Nr, m is a natural number equal to or less than Nt, and j is the OFDM symbol number including a reference signal. $G_{jm}(s)$ is the s-th subcarrier number of the reference signal transmitted from the m-th transmission antenna in the j-th OFDM symbol. Here, assume that s is a natural number equal to or less than Ng(j, m).

Phase component demultiplexing section 2086 demultiplexes the phase components of channel estimation values acquired from reference signals. To be more specific, phase component demultiplexing section 2086 demultiplexes the phase components $\theta_{nm}(j_1, fs)$ and $\theta_{nm}(j_2, fs)$ of channel estimation values $h_{nm}(j_1, fs)$ and $h_{nm}(j_2, fs)$ of an OFDM symbol including reference signals, and outputs these components.

Amplitude component demultiplexing section 2087 demultiplexes the amplitude components of channel estimation values acquired from reference signals. To be more specific, amplitude component demultiplexing section 2087 demultiplexes the amplitude components $|h_{nm}(j_1, fs)|$ and $|h_{nm}(j_2, fs)|$ of channel estimation values $h_{nm}(j_1, fs)$ and $h_{nm}(j_2, fs)$ of an OFDM symbol including reference signals.

First inserting section 2088 calculates the phase component $\theta_{nm}(k_1, fs)$ of the channel estimation value $h_{nm}(k, fs)$ by interpolation, with respect to the $k_1$-th OFDM symbol not including a reference signal, using the phase components $\theta_{nm}(j_1, fs)$ and $\theta_{nm}(j_2, fs)$ of two channel estimation values $h_{nm}(j_1, is)$ and $h_{nm}(j_2, fs)$.

The channel estimation values $h_{nm}(j_1, fs)$ and $h_{nm}(j_2, fs)$ represent the channel estimation values of OFDM symbols including reference signals before and after the OFDM symbol in the time domain ($j_1 < k < j_2$).

Further, linear interpolation, Lagrange interpolation and such are applicable as interpolation.

First extrapolating section 2089 calculates the phase component $\theta_{nm}(k, is)$ of the channel estimation value $h_{nm}(k_2, is)$ by extrapolation, with respect to the $k_2$-th OFDM symbol in the subframe, using the phase component $\theta_{nm}(j_3, fs)$ of the channel estimation value $h_{nm}(j_3, is)$ ($j_3 < k_2$).

The $k_2$-th OFDM symbol is not sandwiched between OFDM symbols including reference signals, and does not include a reference signal. The channel estimation value $h_{nm}(j_2, fs)$ is a channel estimation value of an OFDM symbol including reference signals before the $k_2$-th OFDM symbol.

Here, linear interpolation, Lagrange interpolation and such are applicable as extrapolation.

Second interpolating section 2090 calculates the amplitude component $|h_{nm}(k_1, fs)|$ of the channel estimation value $h_{nm}(k, fs)$ by interpolation, with respect to the $k_1$-th OFDM symbol not including a reference signal, using the amplitude components $|h_{nm}(j_1, fs)|$ and $|h_{nm}(j_2, fs)|$ of two channel estimation values $h_{nm}(j_1, fs)$ and $h_{nm}(j_2, fs)$.

The channel estimation values $h_{nm}(j_1, fs)$ and $h_{nm}(j_2, fs)$ represent estimation values of OFDM symbols including reference signals before and after the OFDM symbol in the time domain where $j_1<k_1<j_2$. Here, linear interpolation, Lagrange interpolation and such are applicable as interpolation.

Second extrapolating section 2091 calculates the phase component $|h_{nm}(k_2, fs)|$ of the channel estimation value $h_{nm}(k_2, fs)$ by extrapolation, with respect to the $k_2$-th OFDM symbol in the subframe, using the phase component $|h_{nm}(j_3, fs)|$ of the channel estimation value $h_{nm}(j_3, fs)$ The $k_2$-th OFDM symbol is not sandwiched between OFDM symbols including reference signals, and does not include a reference signal. The channel estimation value $h_{nm}(j_2, fs)$ is a channel estimation value including a reference signal before the $k_2$-th OFDM symbol where $j_3<k_2$. Here, linear interpolation, Lagrange interpolation and such are applicable as extrapolation.

Interpolation combining section 2092 generates the channel estimation values by interpolation, based on the above-noted phase components and above-noted amplitude components.

To be more specific, interpolation combining section 2092 generates the channel estimation value $h_{nm}(k, fs)=|h_{nm}(k, fs)|\exp(j\theta_{nm}(k, fs))$ based on the phase component $\theta_{nm}(k, fs)$ of the channel estimation value $h_{nm}(k, fs)$ that is the output of first interpolating section 2088 and the amplitude component $|h_{nm}(k, fs)|$ of the channel estimation value $h_{nm}(k, fs)$ that is the output of second interpolating section 2090, and outputs the acquired estimation value to output replacing section 2085.

Extrapolation combining section 2093 generates the channel estimations by extrapolation based on the above-noted phase components and above-noted amplitude components.

To be more specific, extrapolation combining section 2093 generates the channel estimation value $h_{nm}(k, fs)=|h_{nm}(k, fs)|\exp(j\theta_{nm}(k, fs))$ based on the phase component $\theta_{nm}(k, fs)$ of the channel estimation value $h_{nm}(k, fs)$ that is the output of first extrapolating section 2089 and the amplitude component $|h_{nm}(k, fs)|$ of the channel estimation value $h_{nm}(k, fs)$ that is the output of second extrapolating section 2091, and outputs the acquired estimation value to output replacing section 2085.

By the above-described generation of channel estimation values, output replacing section 2085 outputs the channel estimation value by interpolation or the channel estimation value by extrapolation, based on the condition of channel variation.

To be more specific, output replacing section 2085 receives as input the channel estimation value $h_{nm}(k, fs)$ that is the input of interpolation combining section 2092 and the channel estimation value $h_{nm}(k, fs)$ that is the output of extrapolation combining section 2093. Further, output replacing section 2085 outputs the definitive channel estimation value using the same method as in Embodiment 1.

For example, in a case of an OFDM symbol including reference signals, output replacing section 2085 outputs the calculation result (channel estimation value) in frequency domain compensating section 2082.

By contrast, in a case of the k-th OFDM symbol not including a reference signal (between OFDM symbols including reference signals before and after the OFDM symbol in the time domain), output replacing section 2085 outputs the calculation result (channel estimation value) in interpolating section 2083 as is, regardless of the condition of variation in channel variation condition detecting section 2081.

The other components of the channel estimating section including channel variation condition detecting section 2081 are the same as in FIG. 3 in Embodiment 1.

As described above, according to the present embodiment, channel estimation is performed separately between the phase components and amplitude components, so that it is possible to improve the accuracy of channel estimation.

Embodiment 3

A case will be shown with Embodiment 3 where a different frame from the multiplex signal in FIG. 2 in Embodiment 1 is used.

Figure 9:
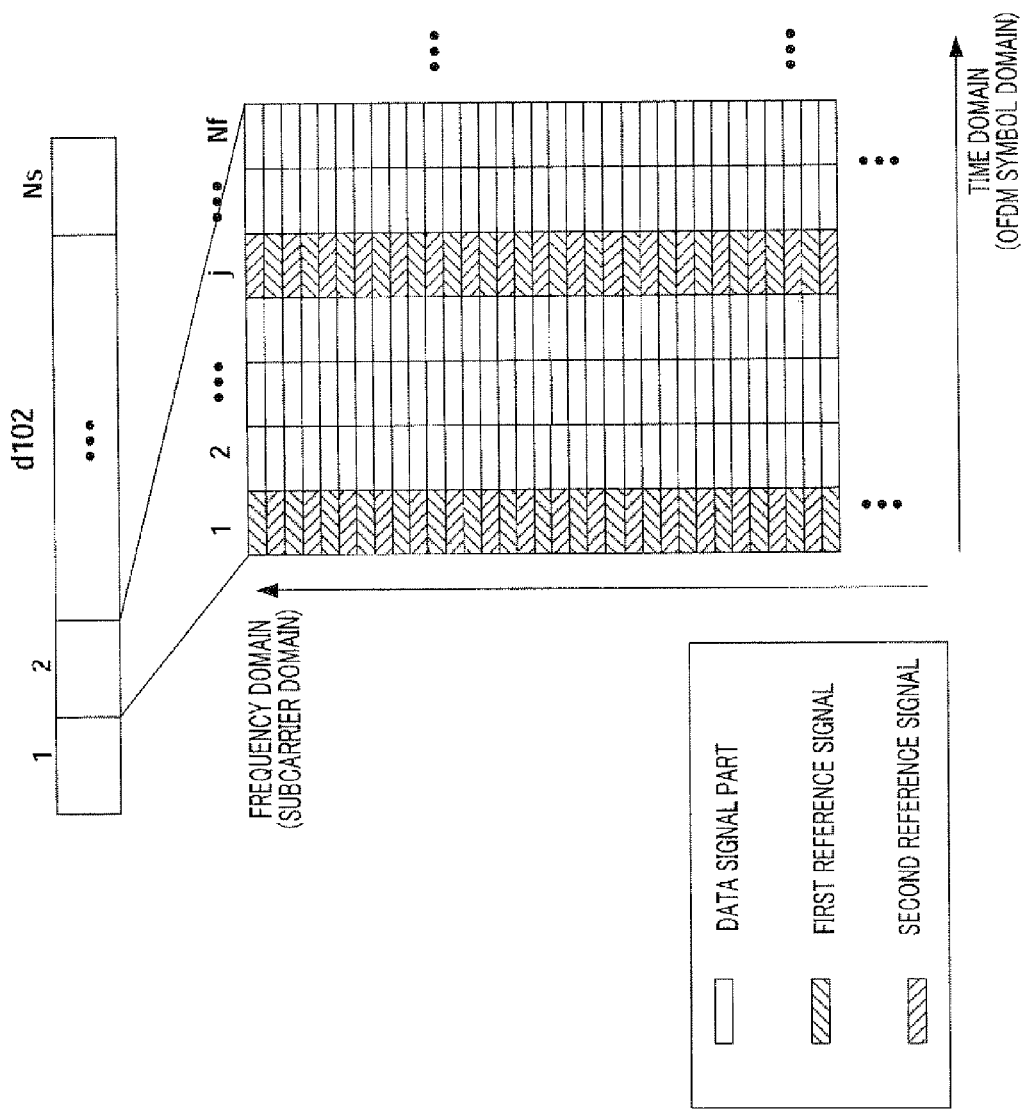
FIG. 9 illustrates a frame configuration of a multiplex signal according to Embodiment 3 of the present invention.

FIG. 9 illustrates the frame configuration of a multiplex signal according to Embodiment 3.

Multiplex signal d102 (one frame) shown in FIG. 9 is comprised of a plurality of (i.e., Ns) subframes. Further, one subframe includes Nf OFDM symbols. The subframe is comprised of a reference signal and a data part including a control signal other than the reference signal.

Reference signals are inserted without space in the frequency domain and inserted intermittently in the time domain in an OFDM symbol. One OFDM symbol includes a plurality of Nc subcarriers.

Upon spatial multiplexing transmission, the positions of subcarriers in which reference signals are inserted in a transmission signal transmitted from different transmission antennas are set differently between transmission antennas.

The positions in which reference signals are inserted vary according to transmission antennas for transmission. For example, when reference signals are inserted in a transmission signal from another transmission antenna, the subcarriers are made null carriers that are not used for transmission. With the above-noted insertion positioning method, upon spatial multiplexing, by transmitting reference signals from different antennas using different subcarriers, it is possible to perform FDM (Frequency Division Multiplex) with respect to the signals and demultiplex and receive the signals upon reception. The other configurations of the radio transmitting apparatus and a reference signal are the same as in FIG. 1 and FIG. 2 in Embodiment 1.

Figure 10:
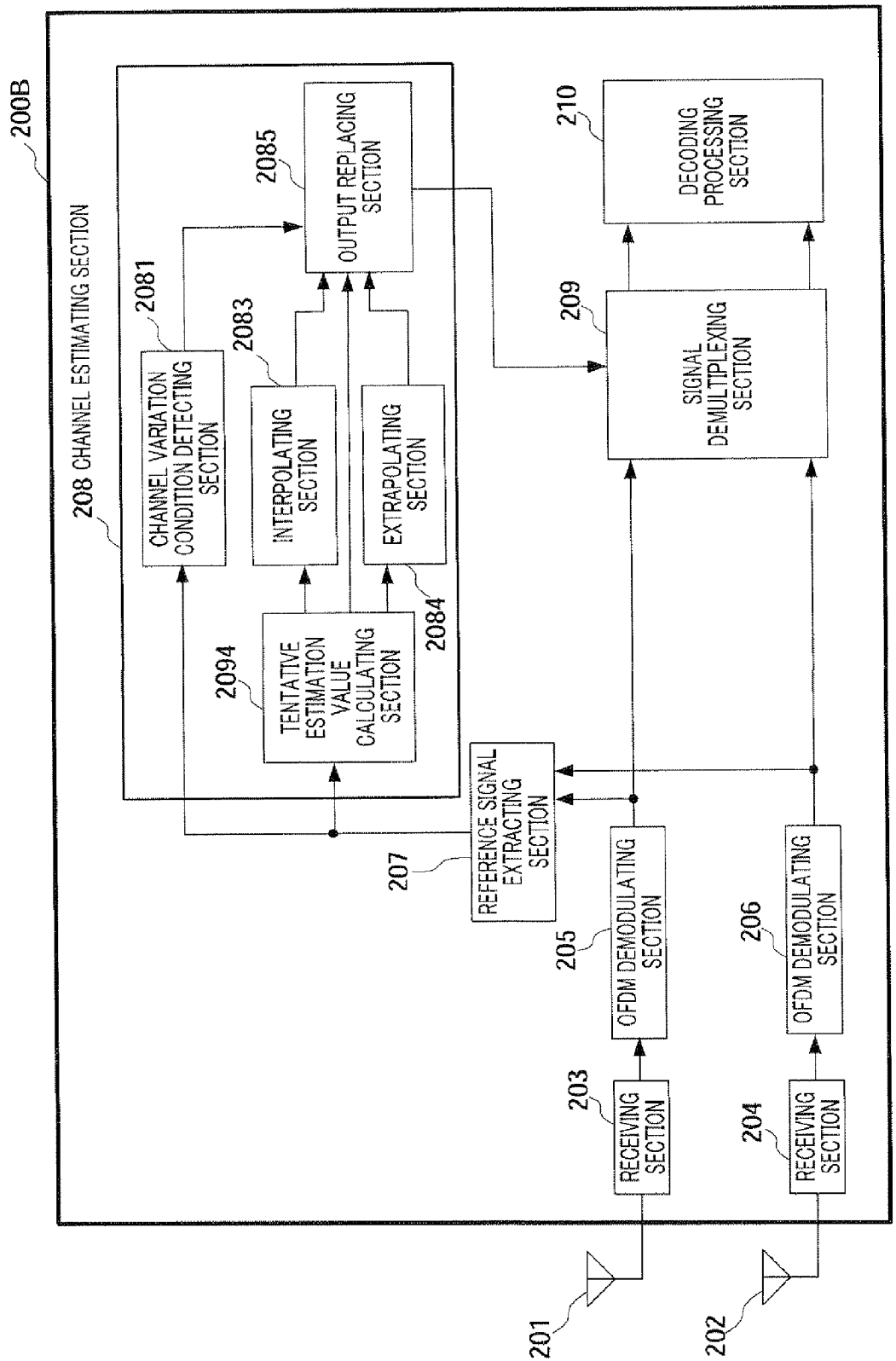
FIG. 10 illustrates a configuration example of a radio receiving apparatus according to Embodiment 3.

FIG. 10 illustrates a configuration example of radio receiving apparatus 200B according to Embodiment 3.

Radio receiving apparatus 200B in FIG. 10 includes tentative estimation value calculating section (frequency tentative estimation value calculating section) 2094 instead of frequency domain interpolating section 2082. The other configurations are the same as in Embodiment 1.

Tentative estimation value calculating section 2094 calculates a channel estimation value $h_{nm}(j, G_{jm}(s))$ with respect to a subcarrier whereby a reference signal is transmitted, in an OFDM symbol including the reference signal. The equation for this calculation is as shown in equation 2. Further, tentative estimation value calculating section 2094 performs interpolation processing (see the interpolation processing method disclosed in Patent Document 1) of channel estimation values in the frequency domain, with respect to subcarriers not including a reference signal, based on $h_{nm}(j, G_{jm}(s))$.

Further, tentative estimation value calculating section 2094 outputs the interpolation processing result to interpolating section 2083 and extrapolating section 2084. Interpolating section 2083 and extrapolating section 2084 each perform the same processing as in Embodiment 1, using the interpolation processing result in tentative estimation value calculating section 2094.

By employing the above-described configuration, the proportion of reference signals in subframes increases. Consequently, although data transmission efficiency decreases, the following effect is acquired. That is, it is possible to calculate a channel estimation value with respect to an OFDM symbol including reference signals without performing interpolation processing in the frequency domain. Therefore, the accuracy of channel estimation is improved.

Embodiment 4

A case will be shown in Embodiment 4 where reference signals of higher transmission power than data signal parts are transmitted.

Figure 11:
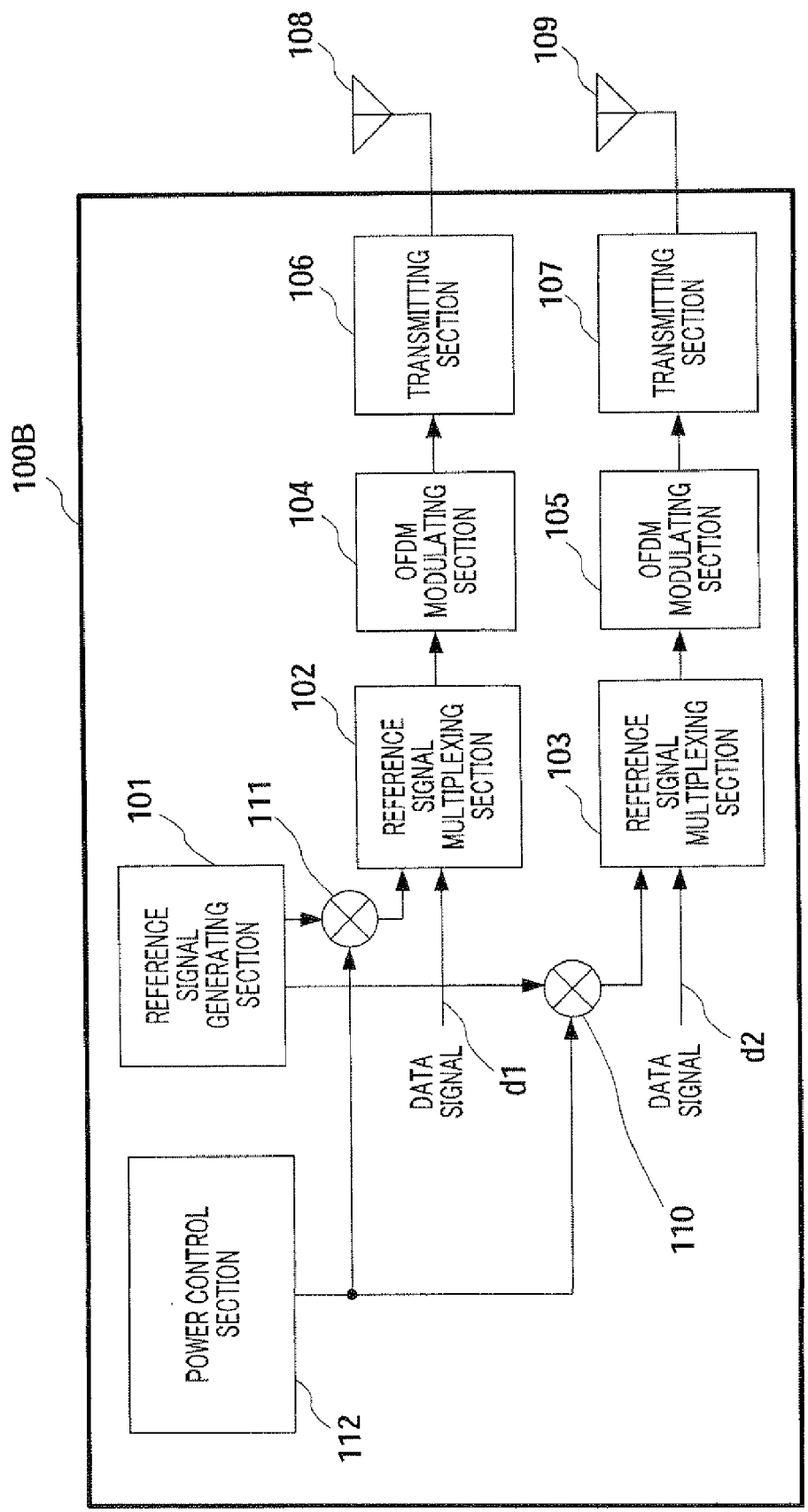
FIG. 11 illustrates a configuration example of a radio transmitting apparatus according to Embodiment 4 of the present invention.

FIG. 11 illustrates a configuration example of radio transmitting apparatus 100B according to Embodiment 4.

Radio transmitting apparatus 100B in FIG. 11 further includes power control section 112 and two multiplexing sections 110 and 111 in addition to radio transmitting apparatus 100 in Embodiment 1. The other components of the radio transmitting apparatus are the same as in the radio transmitting apparatus in Embodiment 1. Therefore, different parts from Embodiment 1 will be mainly explained below.

Power control section 112 outputs weight coefficients for changing the transmission power of reference signals included in an OFDM symbol, to multiplying sections 110 and 111.

Multiplexing sections 110 and 111 multiply the weight coefficients that are the outputs of power control section 112 and reference signals that are the outputs of reference signal generating section 101, and output the results to reference signal multiplexing section 102 and 103. Afterwards, as in Embodiment 1, reference signal multiplexing sections 102 and 103 multiplex the reference signals based on the outputs of multiplying sections 110 and 111, and output the results to ODFM modulating sections 104 and 105. Further, upon multiplexing reference signals, reference signal multiplexing sections 102 and 103 insert power information including a weight coefficient (e.g., β) and positions of the reference signals (i.e., positions of OFDM symbols), into control information.

By employing the above-described configuration, afterwards, data sequences of higher transmission power than data signal parts are emitted from transmission antennas 108 and 109 to the air.

Here, the above-noted weight coefficient is set (e.g., β times, where 1<β) such that the transmission power of reference signals is greater than the transmission power of data signal parts (i.e., the last OFDM symbol including reference signals in a given subframe). By this means, the radio receiving apparatus is more likely to receive reference signals.

Figure 12:
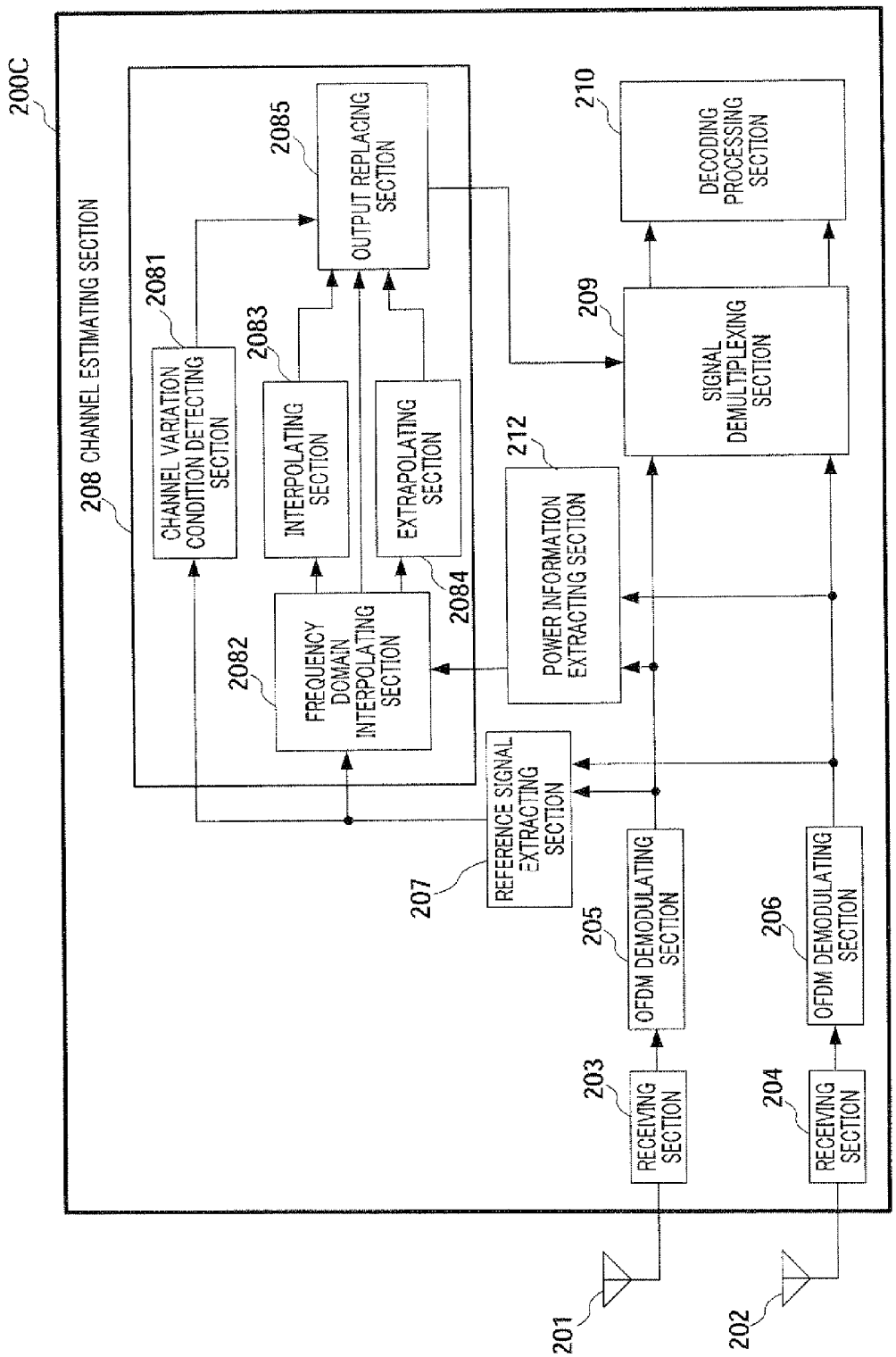
FIG. 12 illustrates a configuration example of a radio receiving apparatus according to Embodiment 4 of the present invention.

FIG. 12 illustrates a configuration example of radio receiving apparatus 2000 according to Embodiment 4.

Radio receiving apparatus 200C in FIG. 12 further includes power information extracting section 212 in addition to radio receiving apparatus in FIG. 3 according to Embodiment 1. The other components of the radio receiving apparatus are the same as in the radio receiving apparatus according to Embodiment 1. Therefore, different parts from Embodiment 1 will be mainly explained.

Power information extracting section 212 extracts the above-noted power information from the control information attached to the data sequences transmitted from radio transmitting apparatus 100B (transmission antennas 108 and 109) in FIG. 11. Further, power information is configured including a weight coefficient (e.g., p) and positions of reference signals.

Frequency domain interpolating section 2082 calculates the channel estimation value $h_{nm}(j, G_{jm}(s))$ with respect to a subcarrier whereby a reference signal is transmitted, in an OFDM symbol including the reference signal, based on the power information (weight coefficient (β) and reference signal position) acquired from power information extracting section 212. The equation for this calculation is shown in equation 7.

[7]

$$h_{nm}(j, G_{jm}(s)) = \frac{y_n(j, G_{jm}(s))}{\sqrt{\beta}\, g_m(j, G_{jm}(s))} \quad \text{(Equation 7)}$$

In equation 7, n is a natural number equal to or less than Nr, m is a natural number equal to or less than Nt, and j is the OFDM symbol number including a reference signal. $G_{jm}(s)$ represents the s-th subcarrier number of the reference signal transmitted from the m-th transmission antenna, in the j-th OFDM symbol. Here, assume that s is a natural number equal to or less than Ng(j, m).

Further, frequency domain interpolating section 2082 performs interpolation processing (see the method disclosed in Patent Document 1) of channel estimation values in the frequency domain, with respect to subcarriers not including a reference signal, based on $h_{nm}(j, G_{jm}(s))$ in equation 7.

By employing the above-described configuration, it is possible to provide the advantage of Embodiment 1, and further increase the transmission power of reference signals and improve the accuracy of channel estimation. Therefore, it is possible to improve received quality.

To be more specific, power control section 112 of radio transmitting apparatus 100B outputs a weight coefficient (β times) such that the transmission power of reference signals is higher than data signal parts. By this means, it is possible to increase the transmission power of reference signals and improve the accuracy of channel estimation.

[Other Transmission Power Control Method]

Further, power control section 112 may control the transmission power of reference signals using the following first to fourth control methods.

According to the first control method, power control section 112 may control subframes such that the transmission power of the last OFDM symbol including reference signals is higher than other OFDM symbols (here, assume that the weight coefficient for the last OFDM symbol is β). In this case, radio receiving apparatus 200C can improve the accuracy of channel estimation of OFDM symbols acquired by extrapolation.

According to the second control method, power control section 112 may control subframes such that, in the last subframe of user personal data, the transmission power of the last OFDM symbol including reference signals is higher than other OFDM symbols (here, assume that the weight coefficient for the last OFDM symbol is β). In this case, it is possible to improve the channel accuracy of channel estimation of an OFDM symbol acquired by extrapolation.

Further, according to the second control method, unlike the first control method, the transmission power of reference signals is increased with respect to minimal OFDM symbols.

By this means, it is possible to prevent the transmission power distribution from decreasing with respect to data signal parts in a data sequence. Therefore, it is possible to suppress a decrease of data transmission efficiency.

According to the third control method, power control section 112 of radio transmitting apparatus 100B controls the transmission power of reference signals according to the condition of channel variation (see equations 3 and 4) in radio receiving apparatus 200C. In this case, radio receiving apparatus 200C further includes a feedback section (detection result transmitting section (not shown)) that transmits a detection result in channel variation condition detecting section 2081 to radio transmitting apparatus 100B (power control section 112).

Further, radio transmitting apparatus 100B (power control section 112) controls the above-noted transmission power according to the detection result. For example, when the channel variation shown in the detection result is greater than a predetermined value, radio transmitting apparatus 100B (power control section 112) outputs a weight coefficient (β times) such that the transmission power of reference signals is higher than data signal parts.

By this means, if the channel variation is greater than a predetermined value, the transmission power of reference signals increases. Therefore, in particular, it is possible to increase the accuracy of channel estimation of an OFDM symbol acquired by extrapolation.

By contrast, if the channel variation is less than the predetermined value, the transmission power of reference signals does not increase, so that it is possible to provide the same advantage (characteristic improvement effect) as in Embodiment 1.

According to the fourth control method (i.e., in a case of TDD (Time Division Duplex) transmission), unlike the third control method, radio transmitting apparatus 100B further includes a fading variation condition detecting section (not shown) that detects the fading variation condition based on a received signal from a reverse link (i.e., the radio link of the direction opposite to the direction from radio transmitting apparatus 100B to radio receiving apparatus 200C).

Even with this configuration, by utilizing the correlation characteristics of channels, the fading variation condition detecting section (not shown) of radio transmitting apparatus 100B can detect the fading variation condition (channel variation) in radio receiving apparatus 200C (on the receiving side). Therefore, radio transmitting apparatus 100E (power control section 112) controls the transmission power of reference signals according to the fading variation condition. By this means, it is possible to provide the same advantage as in the third control method.

[Other Transmission Power Control Method than the Above]

Figure 13:
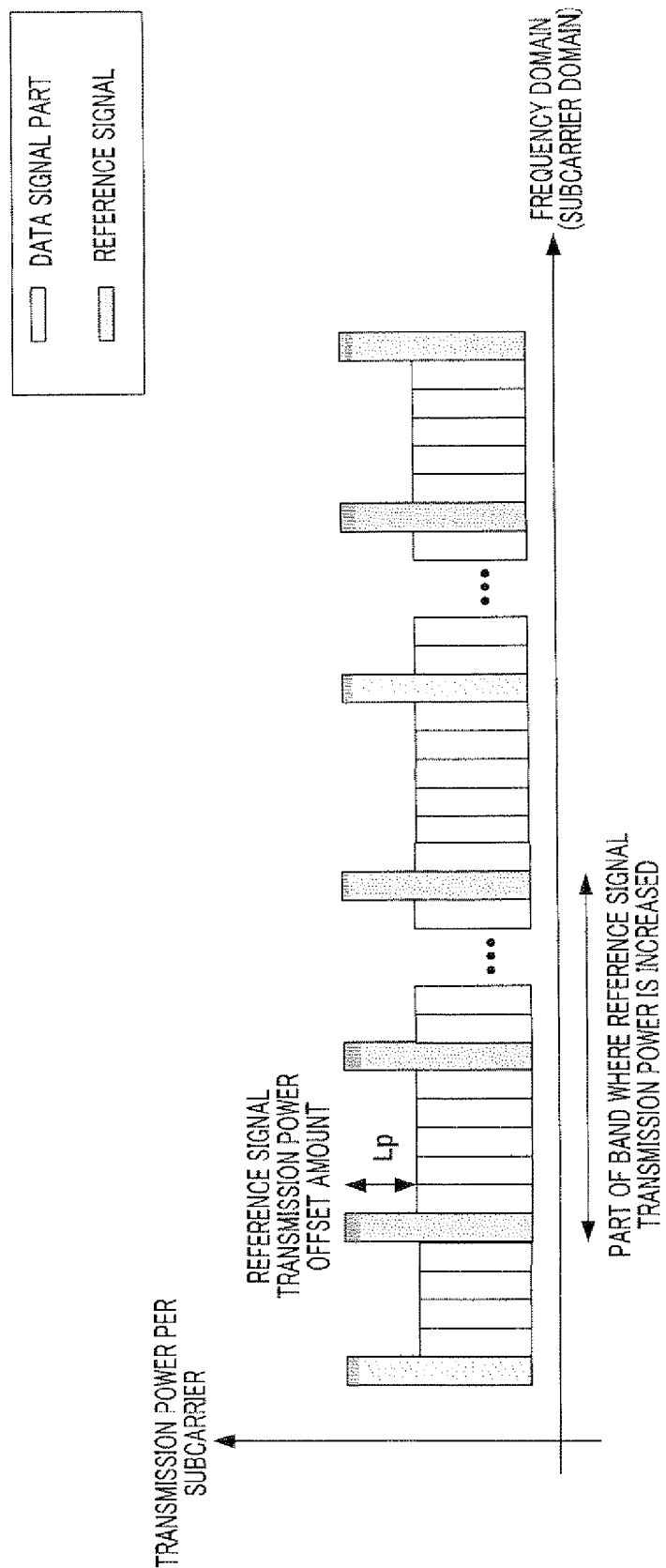
FIG. 13 illustrates an example of transmission power upon increasing transmission power of reference signals by method 1 according to Embodiment 4.

Further, a method (hereinafter "method 1") was described with the present embodiment where the transmission power of reference signals is increased and where the reference signals are transmitted without changing the transmission power of data signal parts when radio transmitting apparatus 100B transmits reference signals having higher transmission power than the data signal parts, as shown in FIG. 13. In method 1, the whole band (all subcarriers used for data transmission in OFDM) in the communication operation band is used as a band for increasing the transmission power of reference signals. In this case, the transmission power of an OFDM symbol including reference signals is higher than an OFDM symbol not including a reference signal.

Further, in method 1, it is possible to change transmission power distribution between data signal parts and reference signals such that the sum of transmission power of subcarrier signals in OFDM symbols is substantially constant. That is, transmission is performed such that, in subframes, the transmission power adding "the total transmission power of all subcarriers assigned different signals from reference signals" to "the total transmission power of all subcarrier signals assigned reference signals," is substantially constant.

Figure 14:
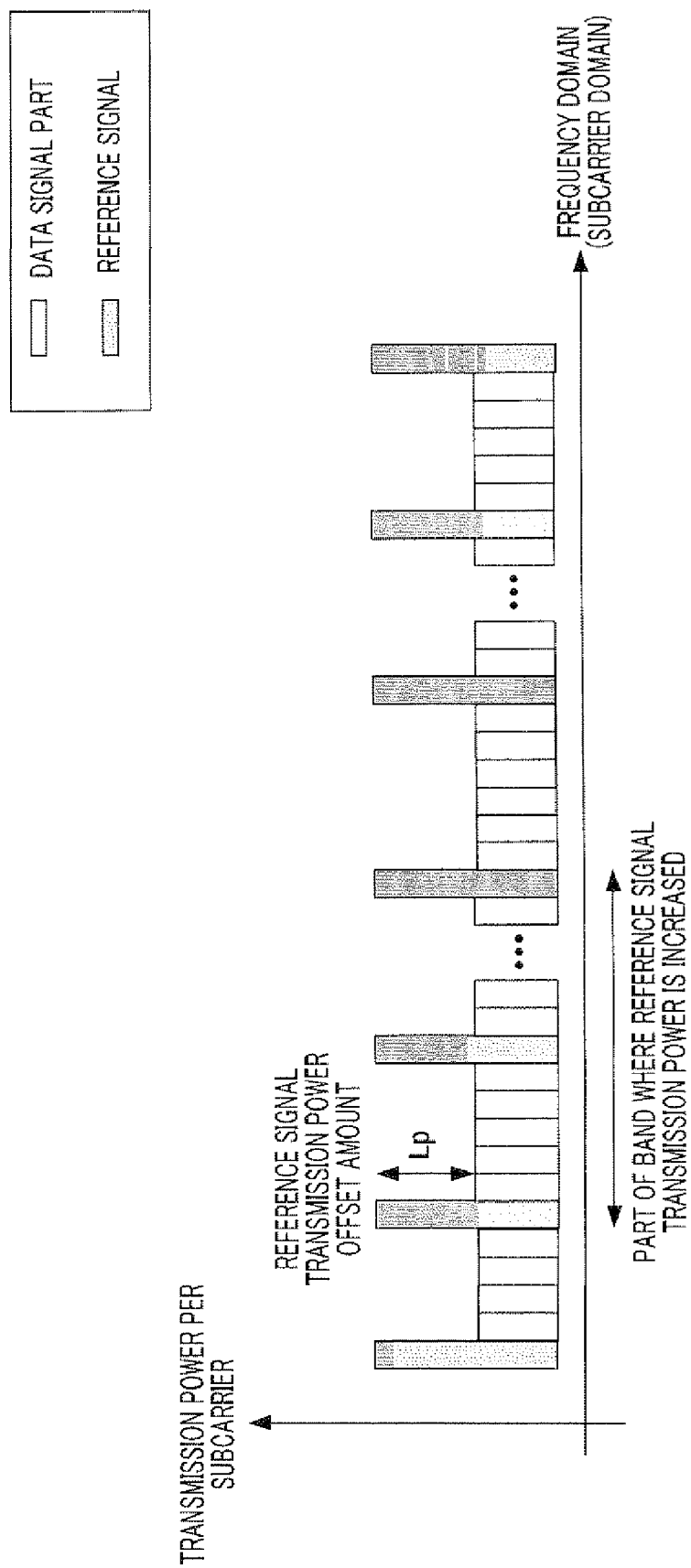
FIG. 14 illustrates another example of transmission power upon increasing transmission power of reference signals by method 1 according to Embodiment 4.

FIG. 14 illustrates a relationship example of the transmission power of reference signals and data signal parts when the transmission power distribution between the data signal parts and reference signals is variable such that the sum of subcarrier signal transmission power in OFDM symbols is substantially constant. As known from FIG. 14, the total transmission power is made constant in subframes. Consequently, although the transmission power of data signal parts decreases, as described later, it is possible to reduce its influence by inserting signals of less-degraded received quality, into data signal parts of lower transmission power.

Figure 15:
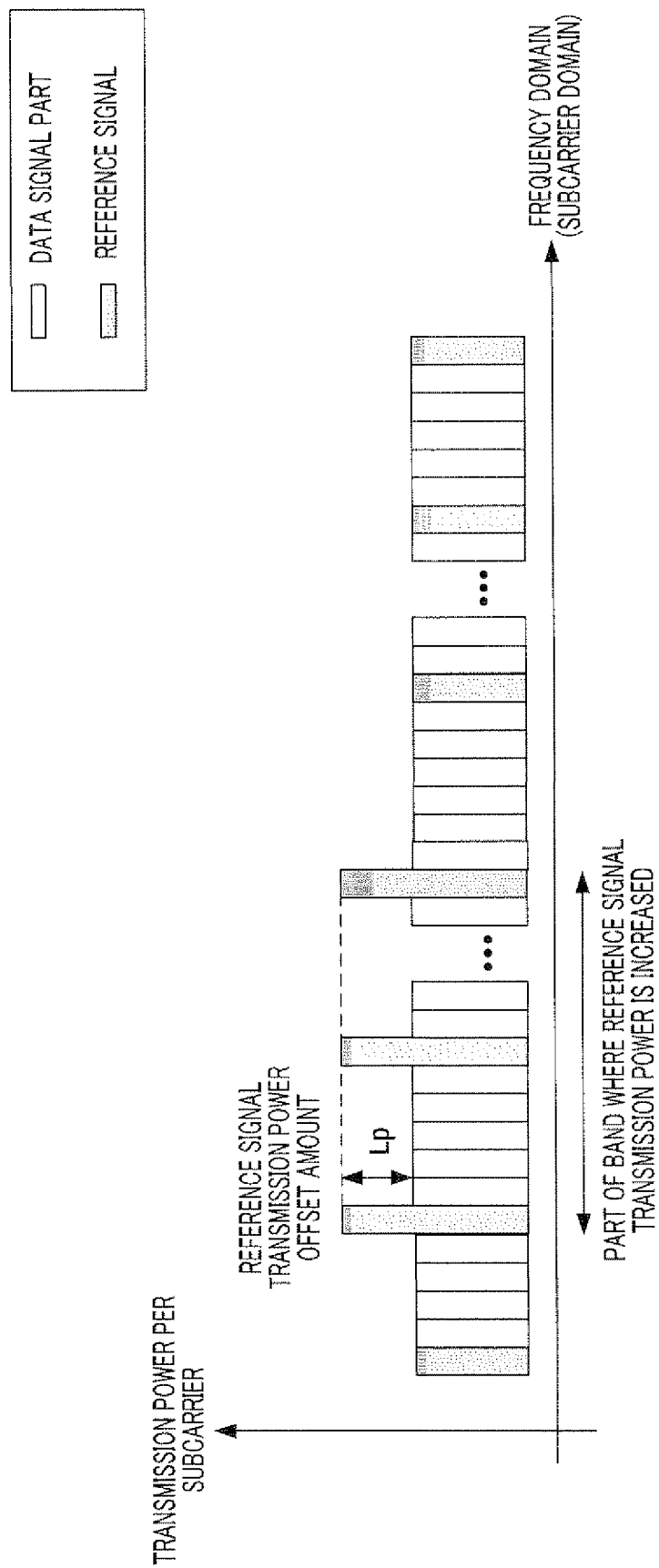
FIG. 15 illustrates an example of transmission power upon increasing transmission power of reference signals by method 2 according to Embodiment 4.

As a different method from method 1, as shown in FIG. 15, a method of increasing the transmission power of reference signals and transmitting the reference signals is applicable only to a partial band selected from the whole band (which is referred to as "subband" and which targets part of all subcarriers used for data transmission in OFDM) (hereinafter "method 2").

Figure 16:
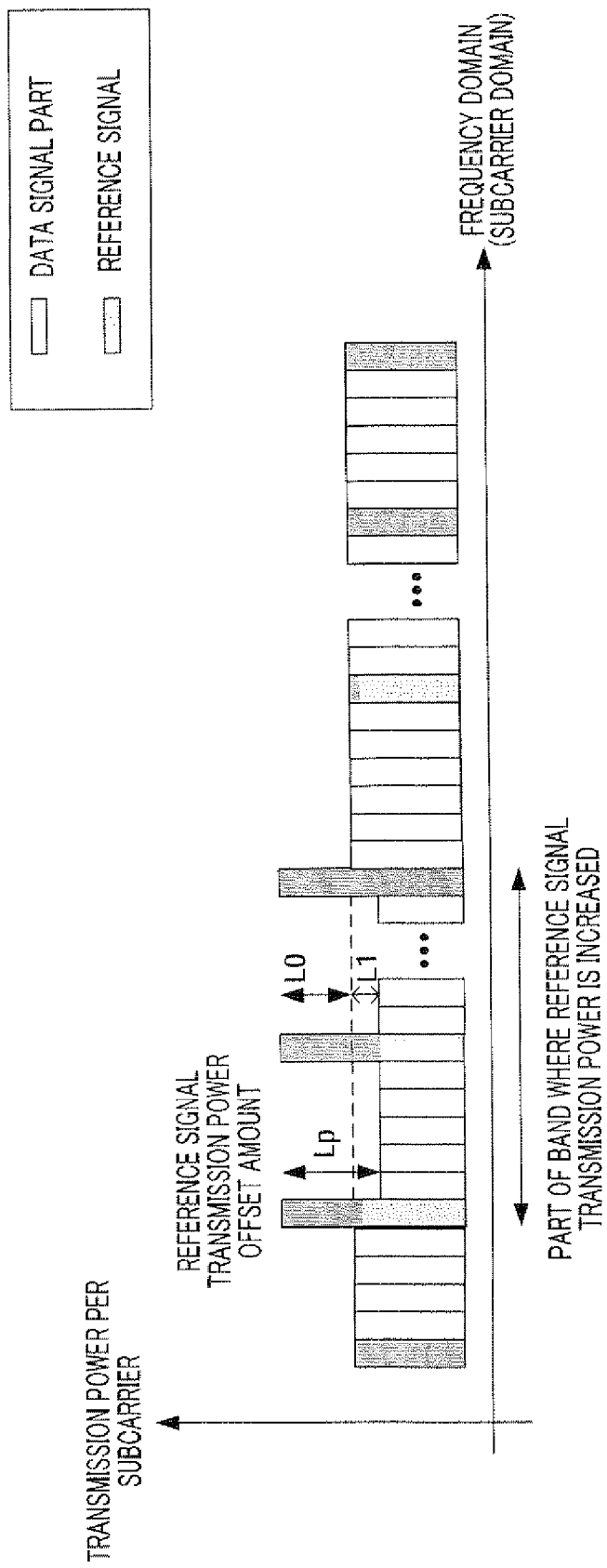
FIG. 16 illustrates another example of transmission power upon increasing transmission power of reference signals by method 2 according to Embodiment 4.

Further, upon increasing the transmission power of reference signals and transmitting the reference signals only in a subband (method 2), as shown in FIG. 16, it is possible to change the transmission power distribution between data signal parts and reference signals such that the sum of subcarrier signal transmission power in OFDM symbols is substantially constant. As known from FIG. 16, in this case, although the transmission power of data signal parts decreases upon increasing the transmission power of reference signals, it is possible to reduce the influence by inserting signals of received quality that is less degraded.

As described above, there is a method of limiting the band in which the transmission power of reference signals is increased, to the whole band of the communication operation band (method 1) or partial band selected from the whole band (method 2), and performing transmission.

A case will be supplementarily explained using FIG. 16 where the band in which the transmission power of reference signals is increased is limited to a subband (method 2), and where, furthermore, total transmission power is constant in subframes.

FIG. 16 illustrates transmission signal levels of reference signals allocated intermittently and data signals, upon performing transmission only in a subband. In the example shown in FIG. 16, a plurality of reference signals having increased transmission power are assigned only in a limited, specific subband. Further, with respect to only a plurality of subcarriers (reference signal transmission power increase partial band) which are assigned data signals and which are sandwiched between the subcarriers of the reference signals having increased transmission power, the transmission power of other data signals is reduced at a constant rate. By this means, transmission can be performed such that the transmission power adding "the total transmission power of all subcarriers assigned different signals from reference signals" to "the total transmission power of all subcarrier signals assigned reference signals," is substantially constant in subframes.

With such transmission method, it is possible to calculate channel estimation values with respect to data signal parts having transmission power reduced at a constant rate by extracting in advance only the subband assigned a plurality of reference signals having increased transmission power, performing interpolation and further performing multiplication by a coefficient taking into account an offset amount, using a reference signal transmission power offset amount. The method of calculating channel estimation values will be described later. By this means, the accuracy of channel estimation is improved, and, by increasing or decreasing the transmission power of subcarriers sandwiched between subcarriers of reference signals at a constant rate, it is possible to simplify the configuration of the channel estimating section. Further, by improving the accuracy of channel estimation, it is possible to improve receiving performance.

Further, upon limiting an increase of the transmission power of reference signals to a subband and performing transmission (method 2), it is further possible to apply the following subband limiting method (a) and subband limiting method (b).

[Subband Limiting Method (a)]

A specific subband in a communication operation band is fixedly assigned as the subband in which the transmission power of reference signals is increased. By this means, a subband in which the transmission power of reference signals is increased is fixed, so that only information about the transmission power of reference signals needs to be reported from the radio transmitting apparatus to the radio receiving apparatus, and information about the positions of subcarriers in which the transmission power of reference signals is increased needs not be reported. Further, when the transmission power of reference signals is adaptively variable, information about the transmission power is reported every time the transmission power of reference signals varies or at regular intervals (e.g., every subframe or frame period).

Further, it is possible to perform frequency resource assignment for preferentially assigning a radio receiving apparatus in a cell edge to the subband in which the transmission power of reference signals is increased. By this means, it is possible to improve channel estimation values in the radio receiving apparatus which is positioned in the cell edge and which especially has an influence on the accuracy of channel estimation, and improve received quality.

[Subband Limiting Method (b)]

A subband of the communication operation band is dynamically assigned as a subband in which the transmission power of reference signals is increased. In this case, it is possible to perform transmission power control for increasing transmission power, with respect to reference signals included in the subband to which a radio receiving apparatus in specific conditions is assigned. Here, as specific conditions, for example, a radio receiving apparatus of lower receiving power (received quality) in the cell edge is selected. By this means, it is possible to improve estimation accuracy of channel estimation values in the radio receiving apparatus in specific conditions and improve received quality.

Further, information about the transmission power of reference signals is reported from the radio transmitting apparatus to the radio receiving apparatus, per subband in which the transmission power of reference signals varies, or at regular intervals (e.g., per subframe or frame period). In subband limiting method (b), compared to subband limiting method (a), although the amount of information to be reported increases, it is possible to provide an advantage of flexibly setting the subband in which the transmission power of reference signals is increased, according to the number of a radio receiving apparatuses in specific conditions.

Here, in this case, by increasing the transmission power of reference signals inserted intermittently in the frequency domain, the transmission power of subcarrier signals other than reference signals in the same OFDM symbol is reduced.

However, even if the transmission power of other signals than reference signals is reduced, by inserting signals of received quality that is less degraded, it is possible to reduce the influence. This will be explained below using FIG. 17.

Figure 17:
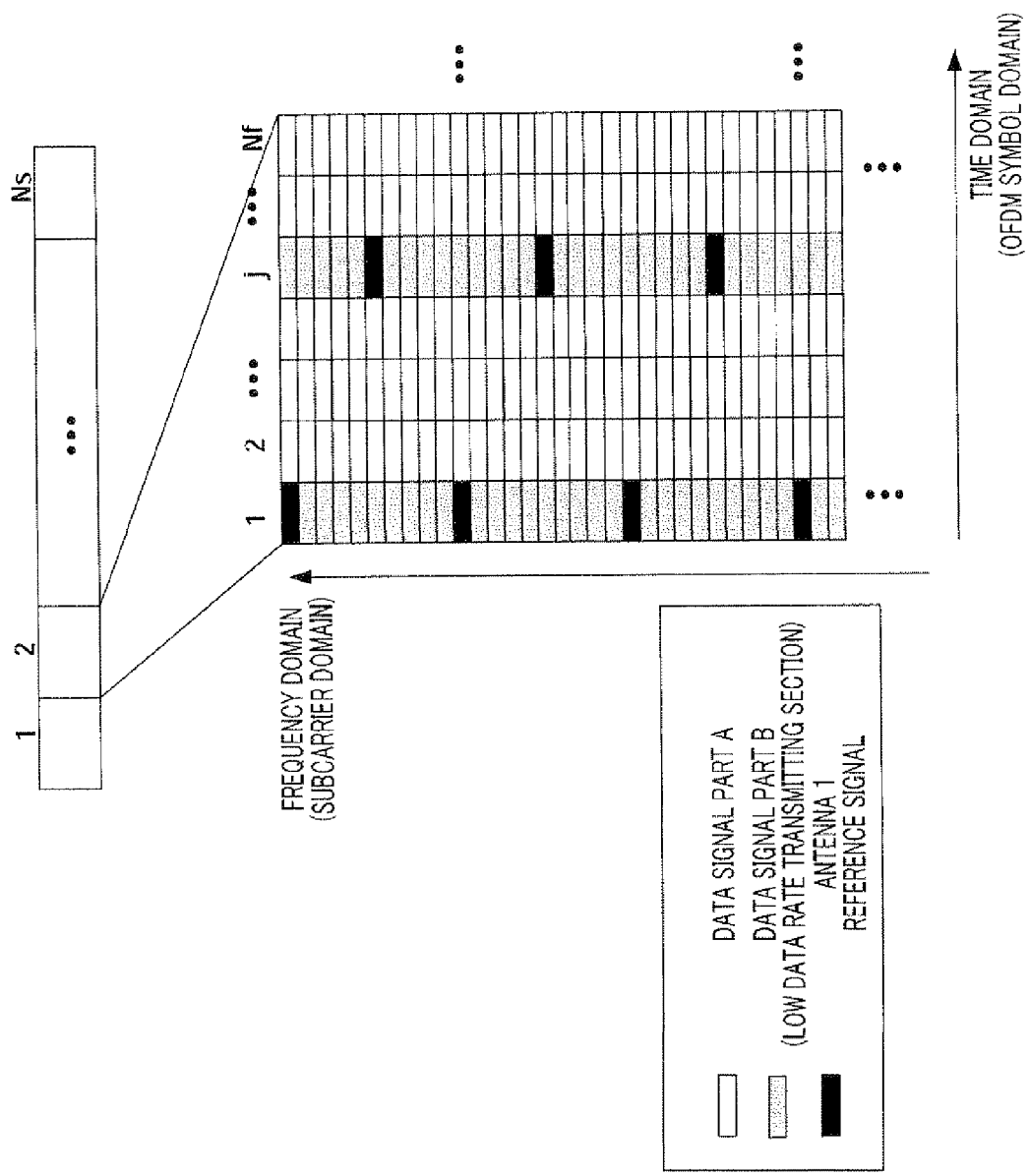
FIG. 17 illustrates another frame configuration of a multiplex signal in a reference signal multiplexing section.

FIG. 17 illustrates an example of the frame configuration of a multiplex signal according to the present embodiment. As data signal part B in the figure, a signal modulated using a low MCS for keeping received quality even in a low SNR (i.e., a signal modulated using a low modulation index and low coding rate), is used. As a signal modulated in a low MCS, there are an individual control signal, shared control signal and broadcast signal. Alternatively, it is equally possible to use a data signal modulated by a low MCS and directed to the radio receiving apparatus in the cell edge. In FIG. 17, data signal part A sets the MCS and transmits a data signal by a conventional method. As described above, in the same OFDM symbol, by using subcarrier signals other than reference signals as signals modulated using a low MCS for keeping received quality even in a low SNR, it is possible to reduce the influence of degradation of received quality due to reduction of the transmission power of subcarrier signals other than reference signals.

The above-described subband limiting methods (a) and (b) are effective in a case where the radio receiving apparatus in the cell edge is assigned to a subband in which the transmission power of reference signals is increased, and where low-MCS data signals are transmitted, and these methods provide an advantage of reducing degradation of received quality of data signals.

Further, upon adopting the above-described methods, by making the average transmission power per OFDM symbol constant, it is possible to apply the methods to a case where the radio transmitting apparatus performs transmission with the maximum transmission power.

The configuration of the radio transmitting apparatus and configuration of the radio receiving apparatus adopting method 2 will be explained below.

[Configuration of Radio Transmitting Apparatus]

Figure 18:
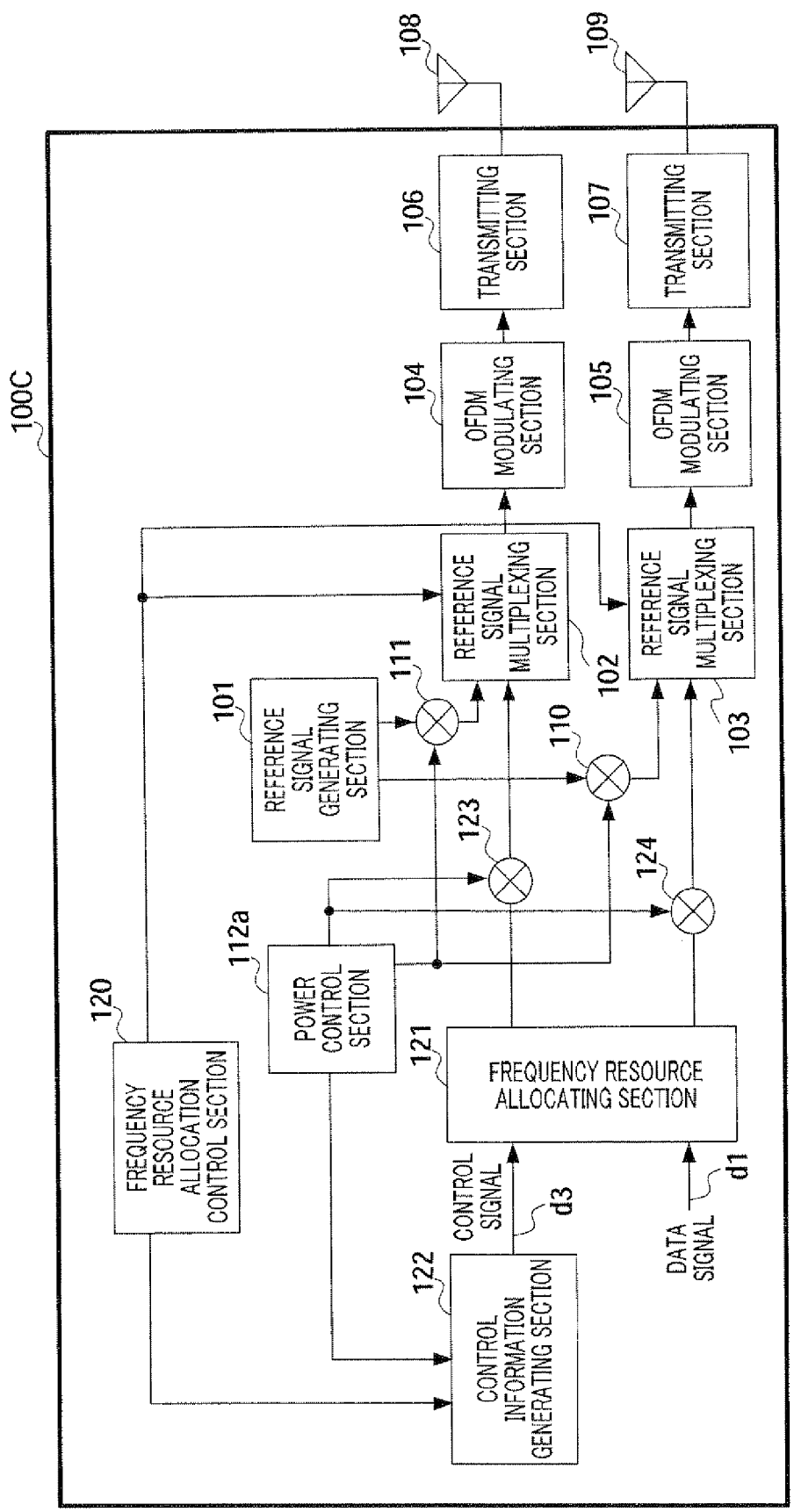
FIG. 18 illustrates a configuration example of a radio transmitting apparatus adopting method 2 according to Embodiment 4.

FIG. 18 illustrates the configuration of radio transmitting apparatus 100C that performs transmission only in a subband in which the transmission power of reference signals is increased (method 2). Radio transmitting apparatus 100C in FIG. 18 further includes frequency resource assignment control section 120, frequency resource assigning section 121 and multiplying sections 123 and 124 for data signals, in addition to radio transmitting apparatus 100B shown in FIG. 11. The other configurations of radio transmitting apparatus 100C are the same as in radio transmitting apparatus 100B. Therefore, different parts from radio transmitting apparatus 100B will be mainly explained.

Frequency resource assignment control section 120 performs frequency resource assignment for preferentially assigning a radio receiving apparatus (having low SIR) in a cell edge to the subband in which the transmission power of reference signals is increased, using received quality information (such as SIR and SINR) reported from the radio receiving apparatus. Here, it is possible to fixedly set in advance a subband in which the transmission power of reference signals is increased (subband limiting method (a)) or it is possible to dynamically change the subband according to the condition of assignment of frequency resources with respect to the radio receiving apparatus (subband limiting method (b)).

Frequency resource assigning section 121 assigns data signals to be transmitted to a different radio receiving apparatus, to subcarriers included in a designated frequency resource, based on frequency resource assignment information outputted from frequency resource assignment control section 120.

Power control section 112a outputs a weight coefficient (e.g., β) for changing the transmission power of reference signals included in an OFDM symbol, to multiplying sections 110 and 111. Further, power control section 112a outputs a weight coefficient (e.g., α) for changing the transmission power of other signals than reference signals included in the OFDM symbol, to multiplying sections 123 and 124. According to the present embodiment, reference signals included in the subband in which the transmission power of reference are multiplied by a weight coefficient equal to or more than one (β≧1). Further, other signals than the reference signals included in the subband in which transmission power of reference signals is increased, are multiplied by a weight coefficient equal to or less than one (α≦1)

Further, Lp in above-described FIG. 13 to FIG. 16 represents the reference signal transmission power offset amount, and the relationship of Lp=β/α holds in power information (α, β). Power control section 112a outputs power control information to control information generating section 122.

Control information generating section 122 generates a control signal based on control information including the power control information. For example, when reference signal multiplexing sections 102 and 103 multiplex reference signals, control information generating section 122 generates a control signal using reference signal power information including power information (α, β) about the reference signal transmission power offset amount Lp and the positions of the reference signals (positions of OFDM symbols) as control information. For the transmission power information included in the reference signal power information, an offset amount based on the transmission power of data signal parts is used. For example, upon decreasing the transmission power of data signal parts, a transmission power offset value based on the transmission power of data signal parts is used for transmission power information. By this means, on the receiving side, it is possible to estimate the offset amount of transmission power for data signal parts based on receiving results of reference signals. Further, even when transmission power varies between reference signals and data signal parts, it is possible to perform demodulation using the transmission power information included in reference signal power information, without degrading data signals.

Multiplying sections 110 and 111 multiply the weight coefficient β that is the output of power control section 112a and the reference signal that is the output of reference signal generating section 101, and output the result to reference signal multiplexing sections 102 and 103. Further, similarly, multiplying sections 123 and 124 multiply the weight coefficient α that is the output of power control section 112a and the output signal of frequency resource assigning section 121, and output the result to reference signal multiplexing sections 102 and 103.

Afterwards, reference signal multiplexing sections 102 and 103 multiplex reference signals and other signals than reference signals (data signal d1, control signal d3), based on the outputs of multiplying sections 123 and 124, and output the results to OFDM modulating sections 104 and 105.

Thus, reference signal multiplexing sections 102 and 103 multiplex control signals including control information about power information (α, β) relating to reference signal transmission power offset amount Lp, and signals including data signals, by reference signals.

Further, upon transmitting a reference signal having increased transmission power using subband limiting method (a), by adopting the following method, it is possible to reduce the amount of information to be reported as power control information. To be more specific, by reducing the transmission power at a constant rate only with respect to a plurality of subcarriers assigned data signals between subcarriers of reference signals having increased transmission power (i.e., reference signal power increase partial band), it is possible to uniquely associate the number of subcarriers for reference signals having increased transmission power with the number of subcarriers for signals having reduced transmission power (such as data signals and control signals) other than reference signals. That is, as shown in equation 8, determining β leads to determination of α, so that it is possible to reduce the amount of information to be reported as power control information.

(Equation 8)

$$\alpha(N_{PRS}-1)(N_{DS}-1) = \beta N_{PRS} \qquad [8]$$

Further, in equation 8, $N_{PRS}$ represents the number of subcarriers assigned a reference signal in the reference signal transmission power increase partial band, and $N_{DS}$ represents the intervals at which reference signals are inserted in the subcarrier domain. If the reference signal transmission power increase partial band is fixed, $N_{PRS}$ is a known uniform value and $N_{DS}$ is a known uniform value.

Further, upon using subband limiting method (a), information about the positions of signals having reduced transmission power other than reference signals is not necessary, so that it is possible to suppress an efficiency decrease upon data transmission.

Further, upon performing transmission using a weight coefficient known in advance without changing the weight coefficient, it is further possible not to report power control information (α, β).

To use subband limiting method (b) and dynamically change the setting of the subband to which reference signals having increased transmission power are attached according to the condition of assignment of frequency resources, frequency resource assignment control section 120 outputs subband information included in the reference signals having increased transmission power, to control information generating section 122.

Control information generating section 122 generates a control signal based on control information including power control information and information about subbands containing reference signals having increased transmission power. Further, for information about the positions of reference signals in which the transmission power is variable, it is possible to variably assign a band or divide the band into N subbands and transmit the numbers of the divided bands. In the latter case, although division of a band is fixed, it is possible to reduce the amount of information of control information about the positions of reference signals included in reference signal power information. Further, by fixedly setting in advance divided bands in which the transmission power is increased, divided band numbers need not be transmitted. Alternatively, whether transmission for increasing transmission power is performed or transmission for increasing transmission power is not performed, can be determined by using one bit of information.

By adopting the above-described configuration, afterwards, data sequences of higher transmission power than data signal parts are emitted from transmission antennas 108 and 109 to the air.

[Radio Receiving Apparatus]

Figure 19:
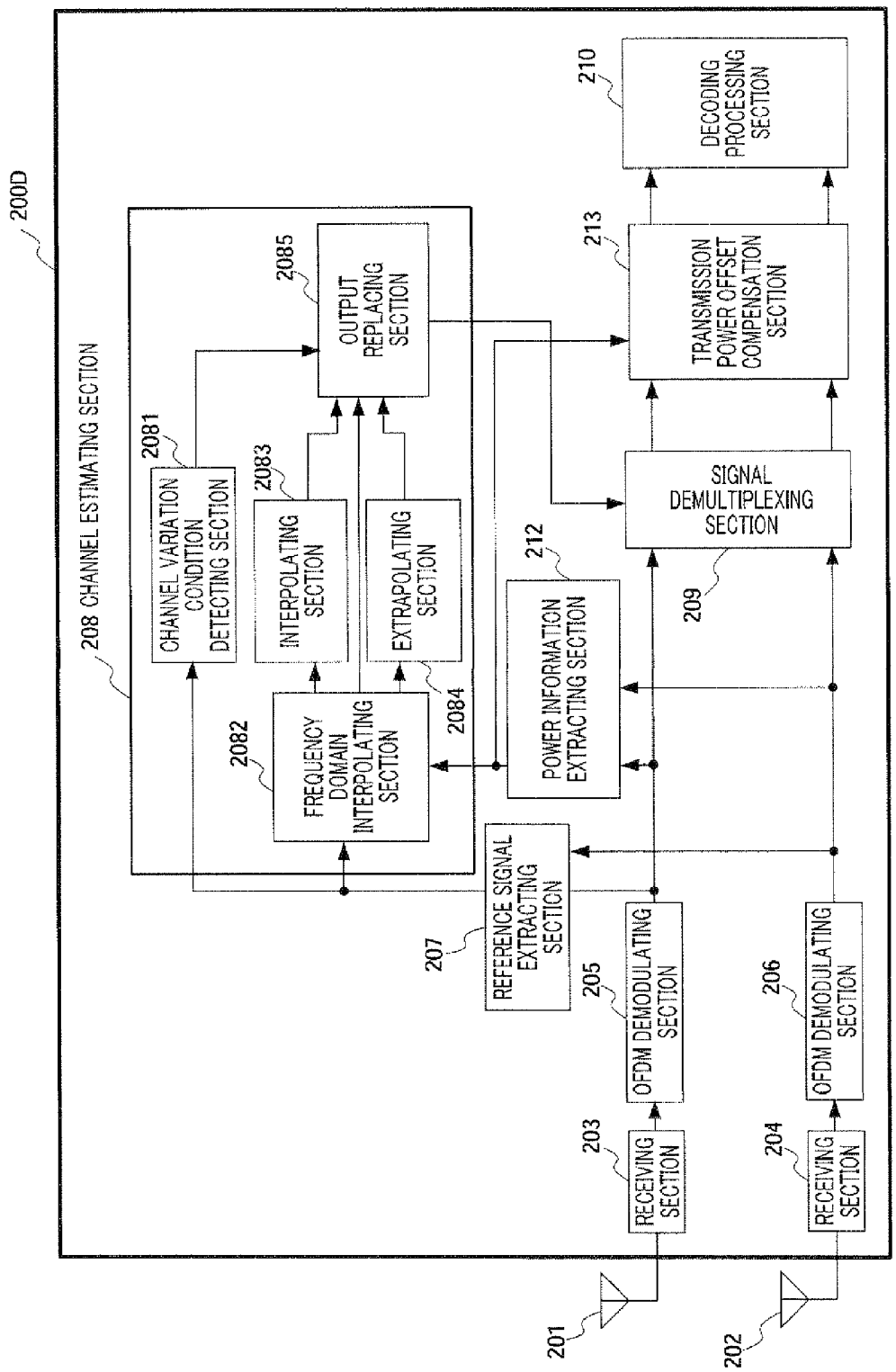
FIG. 19 illustrates a configuration example of a radio receiving apparatus adopting method 2 according to Embodiment 4.

Next, the configuration of the radio receiving apparatus be shown. FIG. 19 illustrates a will configuration example of radio receiving apparatus 200D for radio transmitting apparatus 100C in FIG. 18.

Radio receiving apparatus 200D in FIG. 19 further includes power information extracting section 212 and transmission power offset compensating section 213 in addition to the configuration of radio receiving apparatus 200E in FIG. 10. The other configurations of the radio receiving apparatus are the same as in the radio receiving apparatus according to Embodiment 1. Therefore, different parts from Embodiment 1 will be mainly explained.

Power information extracting section 212 extracts subband information including the above-described transmission power information and reference signals having increased transmission power, from control information attached to a data sequence transmitted from radio transmitting apparatus 100C in FIG. 18. Further, the transmission power information includes information about ($\alpha$, $\beta$) or information about reference signal transmission power offset amount Lp.

Frequency domain interpolating section 2082 calculates a channel estimation value $h_{nm}(j, G_{jm}(s))$ using equation 9 and taking into account the increment of transmission power, based on the transmission power information ($\alpha$, $\beta$) acquired from power information extracting section 212, with respect to subcarriers whereby reference signals having increased transmission power are transmitted in an OFDM symbol including the reference signals.

[9]
$$h_{nm}(j, G_{jm}(s)) = \frac{y_n(j, G_{jm}(s))}{\sqrt{\beta} \, g_m(j, G_{jm}(s))} \quad \text{(Equation 9)}$$

In equation 9, n is a natural number equal to or less than Nr, m is a natural number equal to or less than Nt, and j is the OFDM symbol number including a reference signal. $G_{jm}(s)$ is the s-th subcarrier number for reference signals having increased transmission power transmitted from the m-th transmission antenna in the j-th OFDM symbol. Here, s is a natural number equal to or less than the number of subcarriers, Np(j, m), for reference signals having increased transmission power.

Further, as in the subband limiting method (b), when assignment of subcarriers in which the transmission power of reference signals is increased is dynamically changed according to the condition of assignment of frequency resources in the radio receiving apparatus, subcarriers whereby reference signals having increased transmission power are transmitted, vary. Therefore, transmission power information ($\alpha(s)$, $\beta(s)$) acquired from power information extracting section 212 changes depending on the subcarrier number s. Therefore, frequency domain interpolating section 2082 calculates the channel estimation value hnm(j, Gjm(s)) with respect to subcarriers including a reference signal using equation 10, and performs interpolation processing of channel estimation values in the frequency domain with respect to subcarriers not including a reference signal. Afterwards, channel estimating section 208 performs the same operations as in Embodiment 1, and calculates and outputs channel estimation values.

[10]
$$h_{nm}(j, G_{jm}(s)) = \frac{y_n(j, G_{jm}(s))}{\sqrt{\beta(s)} \, g_m(j, G_{jm}(s))} \quad \text{(Equation 10)}$$

For the output of signal demultiplexing section 209, transmission power offset compensating section 213 compensates an offset with respect to signals included in a reference signal transmission power increase partial band and having changed transmission power (such as data signals and control signals) other than reference signals. This offset is caused by not taking into account a change of the transmission power of the above-noted data signals and control signals in the channel estimation value that is the output of channel estimating section 208. That is, in the signals outputted from signal demultiplexing section 209, based on power control information $\alpha$, transmission power offset compensating section 213 multiplies subcarriers included in the reference signal transmission power increase partial band by offset amount $(\alpha)^{1/2}$.

Further, upon using the subband limiting method (b), a subband for reference signals having increased transmission power is dynamically changed, and subcarriers whereby reference signals having increased transmission power are transmitted vary. Consequently, power information extracting section 212 performs the above-described operations of transmission power offset compensating section 213, using subband information including reference signals having increased transmission power.

By adopting the above-described configuration, afterwards, data sequences having higher transmission power than data signal parts are emitted from transmission antennas 108 and 109 of radio transmitting apparatus 100C to the air. Here, the above-noted weight coefficient is set (e.g., $\beta$ times, where 1<$\beta$) such that the transmission power of reference signals is greater than the transmission power of data signal parts (in the last OFDM symbol including reference signals in a given subframe). By this means, in radio receiving apparatus 200D, it is possible to improve received quality (SNR or SINR) of reference signals.

Further, when the transmission power of reference signals is increased in part of subbands instead of the whole communication operation band, as shown in FIG. 16, transmission is performed such that reference signals having increased transmission power are allocated in both edges of data signals having variable transmission power. By performing allocation in such a way and interpolating the estimation results using channel estimation values of the reference signals having increased transmission power, it is possible to estimate channel estimation values of signals having decreased transmission power by interpolation.

On the other hand, when reference signals having increased transmission power are not allocated to both edges of data signals having variable transmission power, for example, when reference signals are allocated between a reference signal having increased transmission power and a reference signal having transmission power that is not increased, channel estimation values are calculated by (1) extrapolation based on the reference signal having transmission power that is not increased or (2) by interpolation between the reference signal having increased transmission power and the reference signal having transmission power that is not increased. Consequently, the accuracy of channel estimation by interpolation is not sufficient. To be more specific, in case (1), the accuracy of estimation degrades by extrapolation, and, in case (2), the accuracy of estimation degrades due to the influence of noise components attached to the reference signal having transmission power that is not increased. Further, in these cases, compensation processing in the frequency domain by frequency domain compensating section 2082 in channel estimating section 208 may adopt the following method. That is, it is possible to adopt a method of performing interpolation processing in the frequency domain in units of subbands including a reference signal having increased transmission power. By this means, it is possible to use channel estimation values of reference signals having increased transmission power and interpolate the estimation results on a per subband basis, thereby increasing the accuracy of channel estimation.

Further, when the present embodiment is applied to a cellular system forming a plurality of cells, inter-cell interference needs to be taken into account. In this case, by adopting the following method, it is possible to reduce the influence of inter-cell interference and improve system throughput.

To be more specific, by sharing the subband in which the transmission power of reference signals is increased between cells and changing the positions of frequency subcarriers in which reference signals are inserted or the positions of OFDM symbols in the time domain in the subband, subcarrier positions or time in which reference signals are transmitted do not match between different cells. Alternatively, inside and outside the subband, the positions of frequency subcarriers in which reference signals are inserted or the positions of OFDM symbols in the time domain are changed between cells, and the subband in which the transmission power of reference signals is increased is shared between cells.

Further, it is possible to use data signals in the subband in which the transmission power of reference signals is increased, as low-MCS modulation signals. By this means, the positions of frequency subcarriers in which reference signals are inserted and the positions of OFDM symbols in the time domain are different between adjacent cells, so that it is possible to reduce interference between reference signals having increased transmission power. On the other hand, although there is a problem about interference between reference signals having increased transmission power and data signals, even if SINR degrades due to an increase of interference signals from other cells, by using data signals in the subband in which the transmission power of reference signals is increased, as low-MCS modulation signals and transmitting the low-MCS modulation signals having relatively low influence on receiving performance, it is possible to improve robustness to interference signals.

Further, as another method, the following method is possible. For example, the subband in which the transmission power of reference signals is increased is allocated differently between cells. Alternatively, by sharing the subband in which the transmission power of reference signals is increased between cells, and changing the positions of frequencies (subcarriers) in which reference signals are inserted in the subband, the positions of frequencies in which the reference signals are transmitted, do not match. Alternatively, inside and outside the subband in which the transmission power of reference signals is increased, the positions of frequency subcarriers in which reference signals are inserted change between cells, and the subband is shared between cells. Further, it is possible to use data signals in the subband in which the transmission power of reference signals is increased, as low-MCS modulation signals.

By this means, the positions of frequency subcarriers in which reference signals are inserted are different between adjacent cells, so that it is possible to reduce interference between reference signals having increased transmission power. On the other hand, although there is a problem about interference between reference signals having increased transmission power and data signals, even if SINR degrades due to an increase of interference signals from other cells, by transmitting a low-MCS modulation signal having relatively low influence on receiving performance in the subband in which the transmission power of reference signals is increased between adjacent cells, it is possible to improve robustness to interference signals.

Embodiment 5

A case will be shown with Embodiment 5 where the positions of reference signals in an OFDM symbol are variable.

Figure 20:
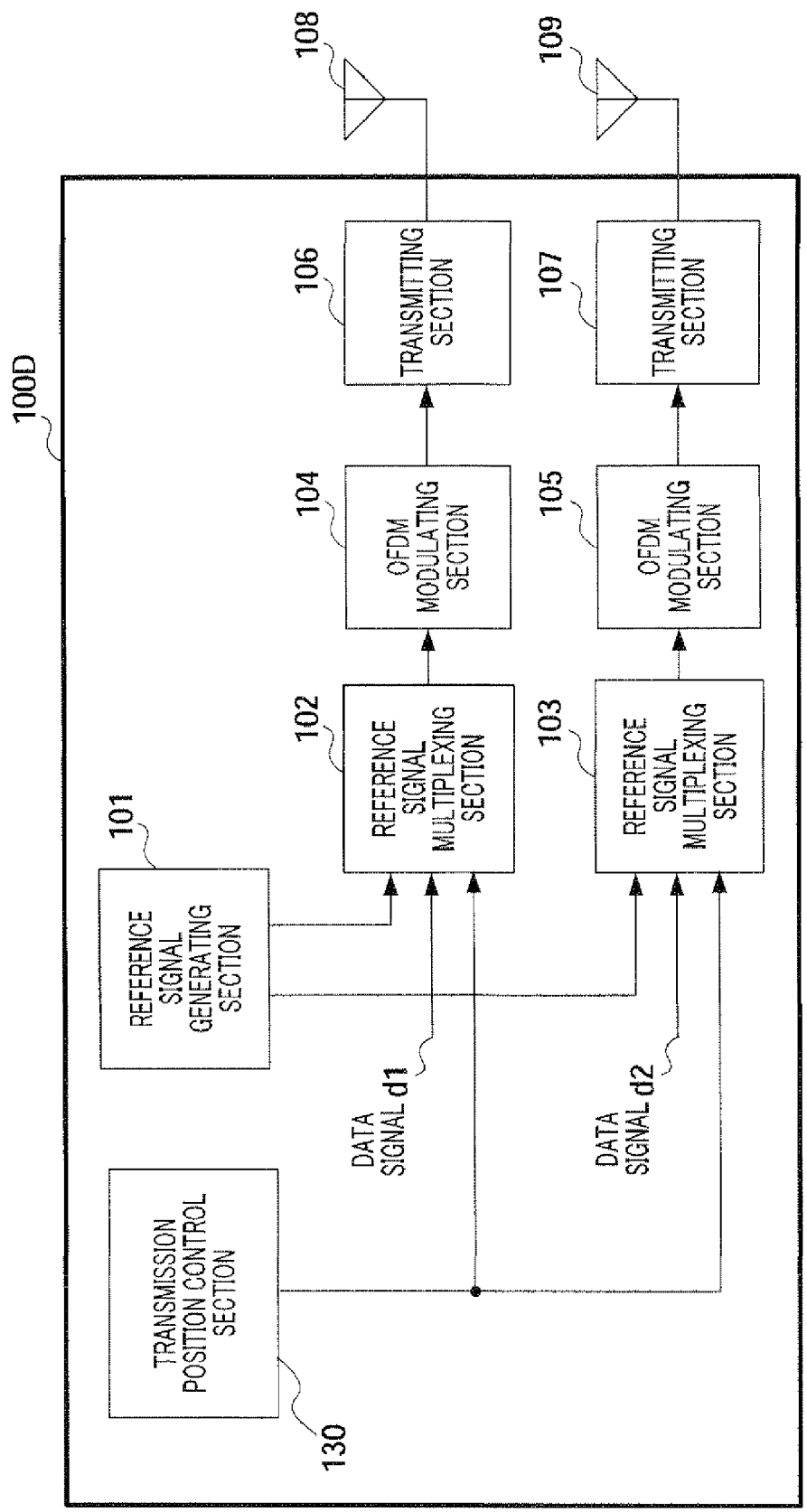
FIG. 20 illustrates a configuration example of a radio transmitting apparatus according to Embodiment 5 of the present invention.

FIG. 20 illustrates a configuration example of radio transmitting apparatus 100D according to Embodiment 5.

Radio transmitting apparatus 100D in FIG. 20 further includes transmission position control section 130 in addition to radio transmitting apparatus according to Embodiment 1 in FIG. 1. The other configurations of the radio transmitting apparatus are the same as in the radio transmitting apparatus according to Embodiment 1. Therefore, different parts from Embodiment 1 will be mainly explained.

Transmission position control section 130 outputs positional information (control signals) showing the transmission positions of transmission reference signals with respect to an OFDM symbol including reference signals, to reference signal multiplexing sections 102 and 103.

The positional information is associated with the condition of channel variation (see equations 3 and 4) in radio receiving apparatus 2000 (channel variation condition detecting section 2081, see FIG. 21) in advance. To be more specific, predetermined values (set in advance) showing the condition of channel variation (see equations 3 and 4) are associated with transmission positions in a data sequence (e.g., the Nf-th position in FIG. 2).

Further, for example, this association is performed using the table (memory) in transmission position control section 130. By this means, for example, when transmission position control section 130 receives as input the condition of channel variation (see equations 3 and 4) showing the detection results in channel variation condition detecting section 2081 (see FIG. 21) and the condition of channel variation shows low speed (predetermined value set in advance), transmission position control section 130 outputs the Nf-th positional information associated with low speed (see FIG. 2).

Alternatively, when the condition of channel variation shows medium speed or high speed (predetermined value set in advance), for example, transmission position control section 130 outputs positional information associated with medium speed or high speed from the i-th to the Nf-th positional information.

Reference signal multiplexing sections 102 and 103 receive as input positional information from transmission position control section 130. Further, reference signal multiplexing sections 102 and 103 allocate and multiplex reference signals to the transmission positions (which change over time) shown by the positional information, and output the results to OFDM modulating sections 104 and 105, respectively. In this case, positional information is included in control information in a data sequence.

For example, when a plurality of subframes are transmitted to a specific user terminal, the reference signal multiplexing sections set reference signals included in the last subframe in subframes of the transmission target, into the last OFDM symbol in the last subframe. The other configurations are the same as shown in FIG. 2.

OFDM modulating sections 104 and 105 perform the same processing as in Embodiment 1, based on the output signals (multiplex signals) of associated reference signal multiplexing sections 102 and 103. Afterwards, OFDM modulating sections 104 and 105, transmitting sections 106 and 107, and transmission antennas 108 and 109 perform the same processing as in Embodiment 1, and data sequences including positional information are emitted to the air from transmission antennas 108 and 109. By this means, radio receiving apparatus 200E receives data sequences including positional information.

Figure 21:
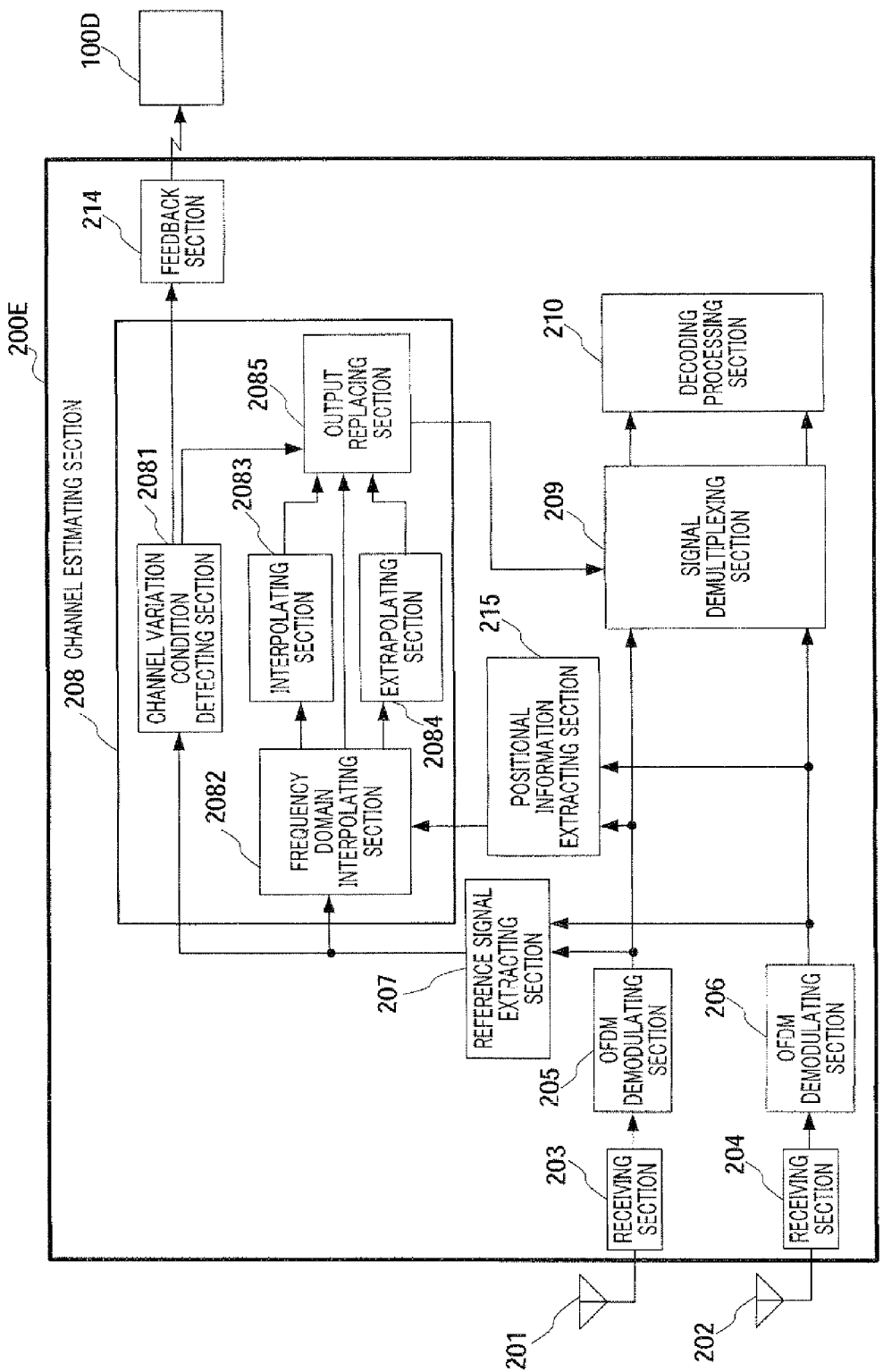
FIG. 21 illustrates a configuration example of a radio receiving apparatus according to Embodiment 5 of the present invention.

FIG. 21 illustrates a configuration example of radio receiving apparatus 200E according to Embodiment 5.

Radio receiving apparatus 200E in FIG. 21 further includes positional information extracting section 215 and feedback section 214 in addition to radio receiving apparatus 200 in FIG. 3 according to Embodiment 1. The other configurations of the radio receiving apparatus are the same as in the radio transmitting apparatus according to Embodiment 1. Therefore, different parts from Embodiment 1 will be mainly explained.

Positional information extracting section 215 receives as input data sequences including positional information from OFDM demodulating sections 205 and 206. Further, positional information extracting section 215 extracts and outputs the positional information to frequency direction interpolating section 2082.

Frequency domain interpolating section 2082 calculates the channel estimation value $h_{nm}(j, G_{jm}(s))$ of subcarriers whereby reference signals are transmitted, with respect to an OFDM symbol including reference signals shown by the positional information acquired from positional information extracting section 215. The equation for this calculation is as shown in equation 2. Further, frequency domain interpolating section 2082 performs interpolation processing (see the interpolation processing disclosed in Patent Document 1) of channel estimation values in the frequency domain, with respect to subcarriers not including a reference signal, based on $h_{nm}(j, G_{jm}(s))$.

Feedback section 214 acquires the detection result in channel variation condition detecting section 2081 and emits the condition of channel variation (see equations 3 and 4) shown by the detection result to the air. By this means, radio transmitting apparatus 100D (transmission position control section 130, see FIG. 20) acquires the condition of channel variation and controls the transmission positions of reference signals according to the condition of channel variation.

For example, when the channel variation (see equations 3 and 4) becomes smaller, radio transmitting apparatus 100D (transmission position control section 130) sets positional information of reference signals such that the OFDM symbol including reference signals and positioned in the end of a subframe is delayed in the time domain and multiplexed.

As described above, according to Embodiment 5, transmission position control section 130 of radio transmitting apparatus 100D controls positional information of reference signals according to the channel variation (see equations 3 and 4) from radio receiving apparatus 200E (feedback section 214). By this means, the following advantage is acquired in addition to the advantage in Embodiment 1.

For example, when a plurality of subframes are transmitted to a specific user terminal, the positions of reference signals included in the last subframe amongst subframes of the transmission target, are set in the last (delay direction in the time domain) OFDM symbol in the subframe (other frames are as shown in FIG. 2).

By this means, as in Embodiment 1, a channel estimation value of an OFDM symbol between a channel estimation value calculated based on the reception result of the last OFDM symbol including reference signals in a subframe and a channel estimation value calculated based on the reception result of the first OFDM symbol including reference signals in the next subframe, are calculated by interpolation.

Further, amongst a plurality of subframes for a specific user, the positions of reference signals are set in the last OFDM symbol (positioned in the delay direction in the time domain) in the subframes. Therefore, without acquiring channel estimation values by extrapolation (or by reducing the OFDM symbol period targeted for extrapolation), it is possible to suppress degradation of channel estimation performance. As a result, it is possible to improve received quality.

Further, for example, radio transmitting apparatus 100D (transmission position control section 130) acquires the channel variation (see equations 3 and 4) from radio receiving apparatus 200E (feedback section 214), and, when the channel variation becomes insignificant, positional information is outputted such that the OFDM symbol including reference signals and positioned in the end of a subframe is delayed in the time domain.

By this means, when channel variation is relatively small, the OFDM symbol period of channel estimation values acquired by interpolation becomes long. That is, the symbol period of channel estimation values by extrapolation becomes short. Consequently, it is possible to suppress degradation of channel estimation accuracy. Therefore, it is possible to improve received quality.

The disclosures of Japanese Patent Application No. 2006-324522, filed on Nov. 30, 2006, and Japanese Patent Application No. 2007-307757, filed on Nov. 28, 2007, including the specifications, drawings and abstracts, are incorporated herein by references in their entireties.

INDUSTRIAL APPLICABILITY

The present invention is useful in a radio transmitting apparatus, radio receiving apparatus, radio transmitting method and radio receiving method for transmitting and receiving signals. In particular, the present invention is useful in a radio transmitting apparatus, radio receiving apparatus, radio transmitting method and radio receiving method upon spatial multiplexing transmission for performing channel estimation using reference signals.

The invention claimed is:

1. A radio transmitting apparatus using a transmission format in which a subframe comprises a plurality of orthogonal frequency division multiplexing symbols, the apparatus comprising:
a generating section that generates a reference signal for channel estimation of a spatial channel;
an assigning section that assigns a data signal to a subcarrier in an orthogonal frequency division multiplexing symbol;
a power adjusting section that adjusts transmission power of the reference signal such that the transmission power of the reference signal is greater than transmission power of the data signal;
a reference signal multiplexing section that allocates the reference signal having the transmission power adjusted in the power transmission adjusting section at predetermined intervals in a frequency domain or a time domain of subcarriers in the orthogonal frequency division multiplexing symbol; and a transmitting section that performs an orthogonal frequency division multiplexing modulation with respect to the data signal and reference signal assigned to the subcarriers in the orthogonal frequency division multiplexing symbol and transmits an acquired orthogonal frequency division multiplexing modulation signal.

2. The radio transmitting apparatus according to claim 1, wherein the predetermined interval is set variable according to a condition of channel variation.

3. The radio transmitting apparatus according to claim 1, wherein the reference signal multiplexing section allocates the reference signal to a specific region in the frequency domain.

4. The radio transmitting apparatus according to claim 3, wherein the specific region in the frequency domain is assigned per cell and varies between adjacent cells.

5. The radio transmitting apparatus according to claim 3, wherein the specific region in the frequency domain is assigned per cell and is common between adjacent cells.

6. The radio transmitting apparatus according to claim 3, wherein the transmission power of the data signal in the specific region in the frequency domain is lower than transmission power of the data signal outside the specific region in the frequency domain.

7. The radio transmitting apparatus according to claim 1, wherein, in the specific region in the frequency domain, the data signal of lower transmission power than the reference signal comprises a binary or quaternary modulation signal.

8. The radio transmitting apparatus according to claim 1, wherein the transmission format is assigned dedicated data for a plurality of users, in a minimum unit of subframes sequentially transmitted in the time domain.

9. The radio transmitting apparatus according to claim 1, wherein, in the subframe, when the channel variation becomes insignificant, the last reference signal allocated to the subframe is allocated to the orthogonal frequency division multiplexing symbol that is located further away in the time domain.

10. The radio transmitting apparatus according to claim 1, wherein the reference signal multiplexing section allocates the reference signal for increasing transmission power, to a specific region in a frequency domain.

11. The radio transmitting apparatus according to claim 10, wherein the specific region in the frequency domain is assigned per cell and is common between adjacent cells.

12. A radio transmitting method using a transmission format in which a subframe comprises a plurality of orthogonal frequency division multiplexing symbols, the method comprising the steps of:

generating a reference signal for channel estimation in a spatial channel;

assigning a data signal to a subcarrier in an orthogonal frequency division multiplexing symbol;

adjusting transmission power of the reference signal such that the transmission power of the reference signal is greater than transmission power of the data signal;

allocating the reference signal of the transmission power adjusted in the power transmission adjusting step at predetermined intervals in a frequency domain or time domain of subcarriers in the orthogonal frequency division multiplexing symbol; and performing an orthogonal frequency division multiplexing modulation with respect to the data signal and reference signal assigned to the subcarriers in the orthogonal frequency division multiplexing symbol and transmitting the acquired orthogonal frequency division multiplexing modulation signal.

* * * * *